US012724514B2

(12) United States Patent
Park et al.

(10) Patent No.: US 12,724,514 B2
(45) Date of Patent: Sep. 1, 2026

(54) DISPLAY DEVICE AND ELECTRONIC DEVICE INCLUDING DISPLAY DEVICE

(71) Applicant: SAMSUNG DISPLAY CO., LTD., Yongin-si (KR)

(72) Inventors: Young Min Park, Yongin-si (KR); Sang Hun Park, Yongin-si (KR); Yong Sub So, Yongin-si (KR); Bo Hwan Lee, Yongin-si (KR); Ho Eung Lee, Yongin-si (KR); Byeong Kyu Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/038,798

(22) Filed: Jan. 28, 2025

(65) Prior Publication Data

US 2025/0284366 A1 Sep. 11, 2025

(30) Foreign Application Priority Data

Mar. 6, 2024 (KR) ........................ 10-2024-0031943

(51) Int. Cl.

| | |
|---|---|
| ***G06F 3/041*** | (2006.01) |
| ***G06F 3/044*** | (2006.01) |
| ***G09G 3/00*** | (2006.01) |
| ***G09G 3/3233*** | (2016.01) |
| ***G09G 3/3266*** | (2016.01) |

(52) U.S. Cl.

CPC .......... *G06F 3/04184* (2019.05); *G06F 3/044* (2013.01); *G09G 3/035* (2020.08); *G09G 3/3233* (2013.01); *G09G 3/3266* (2013.01); *G06F 2203/04101* (2013.01); *G09G 2300/0842* (2013.01); *G09G 2310/0254* (2013.01); *G09G 2310/06* (2013.01); *G09G 2310/08* (2013.01); *G09G 2354/00* (2013.01)

(58) Field of Classification Search

None

See application file for complete search history.

(56) References Cited

U.S. PATENT DOCUMENTS

| | | | | |
|---|---|---|---|---|
| 9,164,615 | B2 | 10/2015 | Cho | |
| 11,003,265 | B2 | 5/2021 | Lee et al. | |
| 11,735,103 | B2 | 8/2023 | Park et al. | |
| 11,832,497 | B2 | 11/2023 | Yang et al. | |
| 2022/0391069 | A1* | 12/2022 | Cho | G06F 3/04184 |

FOREIGN PATENT DOCUMENTS

| | | | |
|---|---|---|---|
| KR | 10-2011435 | B1 | 8/2019 |
| KR | 10-2375642 | B1 | 3/2022 |
| KR | 10-2023-0033791 | A | 3/2023 |
| KR | 10-2534273 | B1 | 5/2023 |
| KR | 10-2557776 | B1 | 7/2023 |

* cited by examiner

*Primary Examiner* — Aneeta Yodichkas

(74) *Attorney, Agent, or Firm* — F. CHAU & ASSOCIATES, LLC

(57) ABSTRACT

A display device including: a display driver configured to output a scan signal during a frame period, the frame period including at least one data writing period; and a sensor driver configured to control a duty cycle of a driving signal during the data writing period based on the scan signal.

15 Claims, 17 Drawing Sheets

FIG. 6

Hsync
Sn (GW)
TX (TS)
1H
PD1
PD2
PD3
PD4
T1
T2
T3
T4
T5
T6
T7
T8

FIG. 7

Hsync
Sn (GW)
TX (TS)
1H
PD1
PD2
PD3
PD4
T1
T2
T3
T4
T5
T6
T7
T8
+
−

PX
ISI1
ENC3
ENC2
ENC1
TFE
PDL
VIA2
CNP2
VIA1
CNP1
ILD
GI2
GI1
BF
ING1
SUB
ISM1
ISM2
LDE2
EML
LDE1
IST1a
IST2
OPN1
FLT
LPL2
LPL1
ING2
ACT GE
DA
LE
UE
Cst
DAM1 DAM2
DAM
ADA1, NDA
BA2
OPN2 TCH1 IST1b
IST1c
ADA2
PDE1a PDE1b
PDE1
DR3
DR2

DISPLAY DEVICE AND ELECTRONIC DEVICE INCLUDING DISPLAY DEVICE

This application claims priority under 35 U.S.C. § 119 to Korean Patent Application No. 10-2024-0031943, filed on Mar. 6, 2024, the disclosure of which is incorporated by reference herein in its entirety.

TECHNICAL FIELD

The disclosure relates to a display device and an electronic device including the display device.

DESCRIPTION OF THE RELATED ART

As information technology advances, the significance of a display device, which serves as an interface between a user and information, has become increasingly prominent. Consequently, the use of a display device, such as a liquid crystal display device and an organic light emitting display device, is on the rise.

A display device typically includes a display unit for visualizing images and a sensor unit for detecting touch inputs. The sensor unit generates a driving signal to activate sensors, which in turn detect external inputs and produce a corresponding sensing signal.

SUMMARY

Embodiments of the disclosure provide a display device that controls a duty cycle of a driving signal.

According to an embodiment of the disclosure, there is provided a display device including: a display driver configured to output a scan signal during a frame period, the frame period including at least one data writing period; and a sensor driver configured to control a duty cycle of a driving signal during the data writing period based on the scan signal.

The data writing period is a period in which the scan signal is set to a turn-on level.

A polarity of the driving signal alternates during each data writing period.

The polarity of the driving signal is a first polarity when a final edge of the driving signal is a first edge during the data writing period, and is a second polarity when the final edge of the driving signal is a second edge during the data writing period.

The frame period includes a first data writing period followed by a second data writing period, and a polarity of the driving signal during the first data writing period is different from the polarity of the driving signal during the second data writing period.

When the polarity of the driving signal is a first polarity during the first data writing period, the polarity of the driving signal is a second polarity during the second data writing period.

The sensor driver includes: a time point calculator configured to calculate a length of the data writing period and calculate a next edge time point; and a signal generator configured to control the duty cycle of the driving signal so that a polarity of the driving signal alternates during each data writing period based on the next edge time point.

During a first data writing period of the frame period, the time point calculator calculates the length of the data writing period from a detected first edge time point of the scan signal and a detected second edge time point of the scan signal.

During a second data writing period after the first data writing period, the time point calculator calculates the next edge time point based on the detected first edge time point of the scan signal in the second data writing period and the length of the second data writing period.

The detected first edge time point is a rising edge time point, and the detected second edge time point and the next edge time point are falling edge time points.

The signal generator adjusts the duty cycle of the driving signal so that a final edge of the driving signal becomes a second edge before the next edge time point, when the final edge of the driving signal of a previous data writing period is a first edge.

According to an embodiment of the disclosure, there is provided a display device including: a display driver configured to output a scan signal during a frame period, the frame period including a plurality of data writing periods; and a sensor driver configured to output a final edge of a driving signal at a fixed time point during each of the plurality of data writing periods, based on the scan signal.

The data writing period is a period in which the scan signal is set to a turn-on level.

The final edge is a falling edge, and the fixed time point is a time point when a first period has elapsed from a start time point of the data writing period.

The final edge is a rising edge, and the fixed time point is a time point when a second period has elapsed from a start time point of the data writing period.

A polarity of the driving signal remains the same throughout the plurality of data writing periods.

According to an embodiment of the disclosure, there is provided a display device including: a display driver configured to output a scan signal during a frame period, the frame period including at least one data writing period; and a sensor driver configured to control the duty cycle of a driving signal during the data writing period in response to the scan signal, wherein the sensor driver adjusts a duty cycle of the driving signal to alternate between a first polarity and a second polarity within each data writing period.

According to an embodiment of the disclosure, there is provided an electronic device that includes a processor to provide input image data, and a display device to display an image based on the input image data. The display device including: a display driver configured to output a scan signal during a frame period, the frame period including at least one data writing period; and a sensor driver configured to control a duty cycle of a driving signal during the data writing period based on the scan signal.

According to the display device disclosed herein, flickering can be prevented by controlling the duty cycle of the sensor unit's driving signal based on the scan signal from the display unit.

BRIEF DESCRIPTION OF THE DRAWINGS

The above and other features of the disclosure will become more apparent through the detailed description of the embodiments, provided with reference to the accompanying drawings, in which:

FIG. 6 is a timing diagram illustrating signals applied to the display unit and the sensor unit of FIG. 1;

FIG. 7 is a timing diagram illustrating a scan signal and a driving signal according to an embodiment of the disclosure;

FIG. 9 is a timing diagram illustrating a scan signal and a driving signal according to an embodiment of the disclosure;

FIG. 10 is a timing diagram illustrating a scan signal and a driving signal according to an embodiment of the disclosure.

DETAILED DESCRIPTION OF THE EMBODIMENTS

Figure 1:
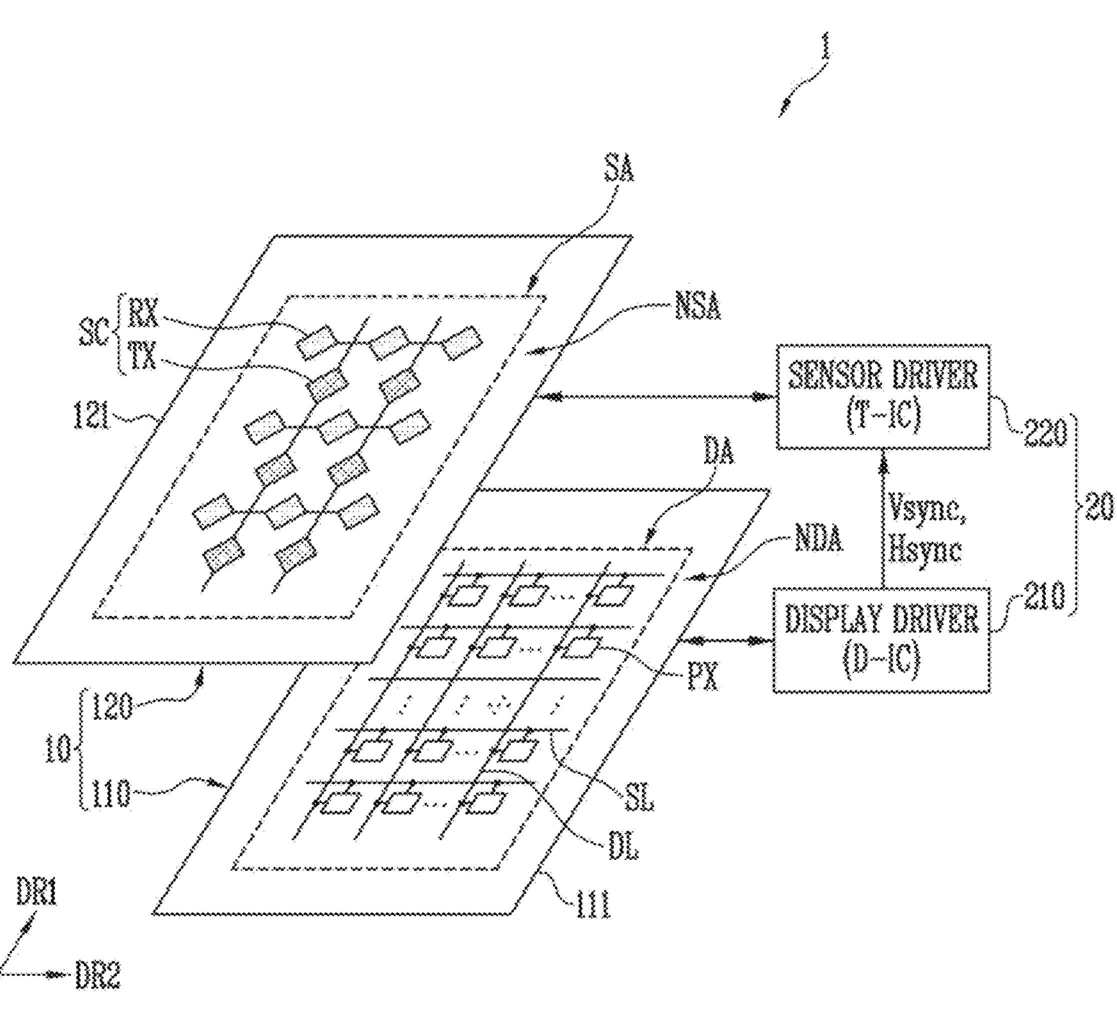
FIG. 1 is a block diagram illustrating a display device according to embodiments of the disclosure.

Hereinafter, various embodiments of the disclosure are described in detail with reference to the attached drawings. The disclosure may be implemented in various forms and is not limited to the embodiments described below.

In the drawings, part unrelated to the disclosure are omitted for clarity, and similar parts are denote by the same reference numerals throughout the specification.

In addition, terms such as "unit" and "module" used below, or functional blocks shown in the drawings, may be implemented as a software configuration, a hardware configuration, or a combination of both. To clearly describe the technical essence of the disclosure, detailed descriptions of overlapping components are omitted.

FIG. 1 is a diagram illustrating a display device according to an embodiment of the disclosure.

Referring to FIG. 1, the display device 1 includes a panel 10 and a driving circuit 20 for driving the panel 10. In addition, the display device 1 may further include, or be connected to, an application processor.

The panel 10 may include a display unit 110 for displaying an image and a sensor unit 120 for sensing touch, pressure, fingerprints, hovering, biometric information (or biometric characteristics), and the like. For example, the panel 10 may include pixels PX and sensors SC positioned to overlap at least a portion of the pixels PX. In an embodiment, the sensors SC may include first sensors TX (or driving electrodes) and second sensors RX (or sensing electrodes). In another embodiment, such as in a self-capacitance mode, the sensors SC may be configured as a single type of sensor, without distinction between the first sensors TX and the second sensors RX.

The driving circuit 20 may include a display driver 210 (D-IC) for driving the display unit 110 and a sensor driver 220 (T-IC) for driving the sensor unit 120. For example, the pixels PX may display an image within a display frame period. For example, the sensors SC may sense a user input with a sensing frame period. The sensing frame period and the display frame period may be independent and distinct from each other. The sensing frame period and the display frame period may be either synchronized or operate asynchronously.

According to an embodiment, the display unit 110 and the sensor unit 120 may be separately manufactured, and then arranged and/or combined so that at least one area overlaps. Alternatively, in another embodiment, the display unit 110 and the sensor unit 120 may be integrally manufactured. For example, the sensor unit 120 may be directly formed on at least one substrate that makes up the display unit 110 (for example, an upper substrate and/or a lower substrate of the display panel, or a thin film encapsulation layer), or on other insulating layers or various types of functional layers (for example, an optical layer or a protective layer).

In FIG. 1, the sensor unit 120 is disposed on a front surface (for example, an upper surface on which an image is displayed) of the display unit 110, but a position of the sensor unit 120 is not limited thereto. For example, in another embodiment, the sensor unit 120 may be disposed on a back surface or both surfaces of the display unit 110. In still another embodiment, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA where an image is displayed and a non-display area NDA outside the display area DA. According to an embodiment, the display area DA may be disposed in a center area of the display unit 110, and the non-display area NDA may be disposed in an edge area of the display unit 110 and surround the display area DA.

The display unit 110 may include at least one of a first display area and a second display area. A viewing angle of the first display area may be less than that of the second display area. A user viewing the first display area from a side surface of the display device 1 may not see an image output in the first display area. Conversely, a user viewing the second display area from the side surface of the display device 1 may see an image output in the second display area.

In an embodiment, an area other than the first display area of the display unit 110 may be the second display area. For example, when an upper half of the display unit 110 is the first display area, a lower half of the display unit 110 may be the second display area. Similarly, when a right half of the display unit 110 is the first display area, a left half of the display unit 110 may be the second display area. If the entire display unit 110 is the first display area, the display unit 110 may not include the second display area. Conversely, if the entire display unit 110 is the second display area, the display unit 110 may not include the first display area.

The display substrate 111 may be a rigid substrate or a flexible substrate, with no particular limitations on its material or physical properties. For example, the display substrate 111 may be a rigid substrate configured of organic or tempered glass, or a flexible substrate configured of a thin film of a plastic or metal material.

Scan line SL, data lines DL, and the pixels PX connected to the scan lines SL and the data lines DL are disposed in the display area DA. The pixels PX are selected by a scan signal of a turn-on level supplied from the scan lines SL, receive a data signal from the data lines DL, and emit light with a luminance corresponding to the data signal. Consequently, an image corresponding to the data signal is displayed in the display area DA. In the disclosure, a structure, driving method, and other aspects of the pixels PX are not particularly limited. For example, each of the pixels PX may be implemented using various currently known structures and driving methods.

In the non-display area NDA, various lines and/or built-in circuit units connected to the pixels PX of the display area DA may be disposed. For example, a plurality of lines for supplying various power and control signals to the display area DA may be disposed in the non-display area NDA, and a scan driver or similar components may be further disposed in the non-display area NDA.

In the disclosure, a type of the display unit 110 is not particularly limited. For example, the display unit 110 may be implemented as a self-emission display panel such as an organic light emitting display panel. However, when the display unit 110 is implemented as a self-emission type, the pixels PX are not restricted to only organic light emitting elements. For example, the light emitting element of each of the pixels PX may be configured using an organic light emitting diode, an inorganic light emitting diode, a quantum dot/well light emitting diode, or the like. A plurality of light emitting elements may be provided in each of the pixels PX. The plurality of light emitting elements may be connected in series, parallel, series-parallel, or the like. Alternatively, the display unit 110 may be implemented as a non-emission display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors SC formed on the sensor substrate 121. The sensors SC may be disposed in a sensing area SA on the sensor substrate 121.

The sensor substrate 121 may include the sensing area SA in which a touch input or the like may be sensed, and a peripheral area NSA outside the sensing area SA. According to an embodiment, the sensing area SA may be disposed to overlap at least one area of the display area DA. For example, the sensing area SA may correspond to the display area DA (for example, an area overlapping the display area DA), and the peripheral area NSA may correspond to the non-display area NDA (for example, an area overlapping the non-display area NDA). In this case, when the touch input or the like occurs on the display area DA, the touch input or the like may be detected through the sensor unit 120.

The sensor substrate 121 may be a rigid or flexible substrate, and may be configured of at least one insulating layer. In addition, the sensor substrate 121 may be a transparent or translucent light-transmitting substrate, but is not limited thereto. In other words, in the disclosure, a material and a physical property of the sensor substrate 121 are not particularly limited. For example, the sensor substrate 121 may be a rigid substrate configured of glass or tempered glass, or a flexible substrate configured of a thin film of a plastic or metal material. In addition, according to an embodiment, at least one substrate (for example, the display substrate 111, an encapsulation substrate, and/or a thin film encapsulation layer) that forms part of the display unit 110, as well as an insulating layer, a functional layer, or similar layers disposed inside and/or on an outer surface of the display unit 110, may be used as the sensor substrate 121.

The sensing area SA is an area capable of responding to the touch input (in other words, an active area of a sensor). To this end, the sensors SC for detecting the touch input or similar interactions may be disposed in the sensing area SA. According to an embodiment, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction crossing the first direction DR1. In another embodiment, an extension direction and an arrangement direction of the first sensors TX may follow a conventional configuration. Each of the first sensors TX may be configured with first cells of a relatively large area connected by first bridges of a relatively narrow area. In addition, in FIG. 1, each of the first cells is shown in a diamond shape; however, they may also be configured in various conventional shapes such as circles, quadrangles, triangles, or mesh forms. For example, the first bridges may be integrally formed on the same layer as the first cells. In another embodiment, the first bridges may be formed on a layer different from that of the first cells and may electrically connect adjacent first cells.

For example, each of the second sensors RX may extend in the second direction DR2. The second sensors RX may be arranged in the first direction DR1. In another embodiment, an extension direction and an arrangement direction of the second sensors RX may follow another conventional configuration. Each of the second sensors RX may be configured with second cells of a relatively large area connected by second bridges of a relatively narrow area. In FIG. 1, each of the second cells is shown in a diamond shape; however, they may also be configured in various conventional shapes such as circles, quadrangles, triangles, or mesh forms. For example, the second bridges may be integrally formed on the same layer as the second cells. In another embodiment, the second bridges may be formed in a layer different from that of the second cells and may electrically connect adjacent second cells.

According to an embodiment, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In this case, the first sensors TX and the second sensors RX may be configured in a mesh form. In addition, the first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), a carbon nano tube, graphene, and the like. In addition, the first sensors TX and the second sensors RX may have conductivity by including at least one of various conductive materials. Each of the first sensors TX and the second sensors RX may be formed from a single layer or multiple layers, and their cross-sectional structure is not particularly limited.

Sensor lines for electrically connecting the first and second sensors TX and RX to the sensor driver 220 and similar components may be primarily located in the peripheral area NSA of the sensor unit 120.

The driving circuit 20 may include the display driver 210 for driving the display unit 110 and the sensor driver 220 for driving the sensor unit 120. In an embodiment, the display driver 210 and the sensor driver 220 may be configured of integrated chips (ICs) separated from each other. In another embodiment, at least a portion of the display driver 210 and the sensor driver 220 may be integrated together in one integrated circuit (IC).

The display driver 210 is electrically connected to the display unit 110 to drive the pixels PX. For example, the display driver 210 may include the data driver and a timing controller, while the scan driver may be separately mounted in the non-display area NDA of the display 110. In another embodiment, the display driver 210 may include all or at least a portion of the data driver, the timing controller, and the scan driver.

The display driver 210 may receive image data and control signals from the application processor. A first oscillator may be provided inside the display driver 210 to generate a first clock signal. The display driver 210 may determine the driving frequency (or the frame rate) using synchronization signals included in the control signals. The display driver 210 may generate various signals, including a vertical synchronization signal Vsync and a horizontal synchronization signal Hsync, by dividing the first clock signal.

For example, the control signal supplied from the application processor to the display driver 210 may include an external vertical synchronization signal, an external horizontal synchronization signal, and the like. The display driver 210 may generate the vertical synchronization signal Vsync and the horizontal synchronization signal Hsync to be used inside the display device 1 by using the external vertical synchronization signal and the external horizontal synchronization signal.

Figure 2:
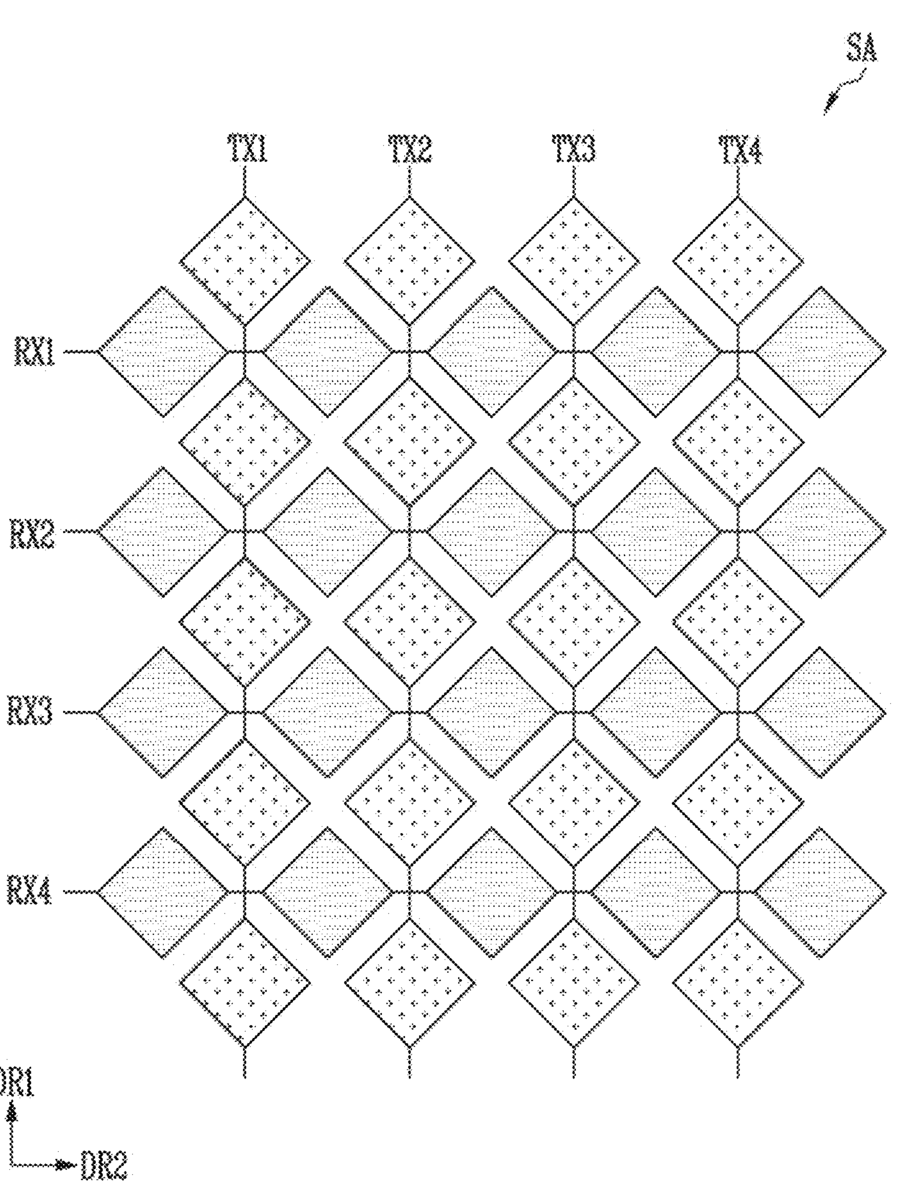
FIG. 2 is a diagram illustrating an embodiment of sensors included in the display device of FIG. 1.

FIG. 2 is a diagram illustrating an embodiment of sensors included in the display device of FIG. 1.

Referring to FIGS. 1 and 2, first sensors TX1, TX2, TX3, and TX4 and second sensors RX1, RX2, RX3, and RX4 positioned in the sensing area SA are shown. For convenience of description, it is assumed that the four first sensors TX1 to TX4 and the four second sensors RX1 to RX4 are disposed in the sensing area SA. It is to be understood, however, that y (for example, y is a natural number) to p (for example, p is a natural number greater than y) first sensors TX and second sensors RX may be disposed in the display device 1.

Since a description of the first sensors TX1 to TX4 and the second sensors RX1 to RX4 is the same as that of the first sensors TX and the second sensors RX of FIG. 1, an overlapping description is omitted.

Figure 3:
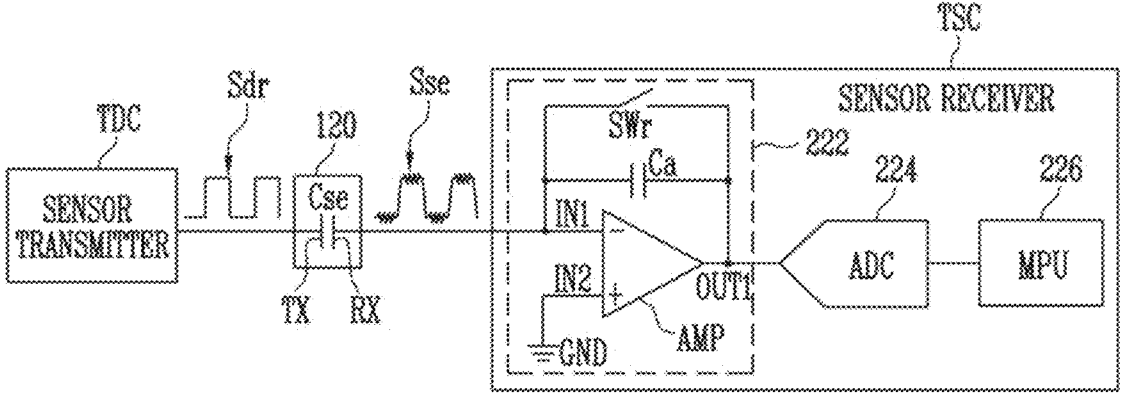
FIG. 3 is a diagram illustrating a touch sensing period.

FIG. 3 is a diagram illustrating a touch sensing period.

Referring to FIGS. 1 to 3, the touch sensing period may be a period in which the sensor unit 120 and the sensor driver 220 sense an external touch. FIG. 3 illustrates the operation of the sensor unit 120 and the sensor driver 220 during the touch sensing period based on one sensor channel 222.

The sensor driver 220 may include a sensor receiver TSC and a sensor transmitter TDC. In the touch sensing period, the sensor transmitter TDC may be connected to the first sensors TX, and the sensor receiver TSC may be connected to the second sensors RX.

The sensor receiver TSC may include an operational amplifier AMP, an analog-to-digital converter 224, and a processor 226. As an example, each sensor channel 222 may be implemented as an analog front end (AFE) including at least one operational amplifier AMP. The analog-to-digital converter 224 and the processor 226 may be provided for each sensor channel 222, or may be shared by a plurality of sensor channels 222.

A first input terminal IN1 of the operational amplifier AMP may be connected to the corresponding second sensors RX, and a second input terminal IN2 of the operational amplifier AMP may be connected to a ground GND. For example, the first input terminal IN1 may be an inverting terminal, and the second input terminal IN2 may be a non-inverting terminal. According to an embodiment, the second input terminal IN2 may be connected to a signal with a specific voltage magnitude.

The analog-to-digital converter 224 may be connected to an output terminal OUT1 of the operational amplifier AMP. The analog-to-digital converter 224 may convert an output of the operational amplifier AMP into a digital sensing value and output the sensing value. A capacitor Ca and a switch SWr may be connected in parallel between the first input terminal IN1 and the output terminal OUT1.

A sensing signal Sse corresponding to a driving signal Sdr may be output through the second sensors RX1 to RX4 by a mutual capacitance Cse formed between each of the first sensors TX1 to TX4 and the second sensors RX1 to RX4 around the first sensors TX1 to TX4. The sensing signal Sse may be input to the sensor receiver TSC and used to detect touch input.

According to an embodiment, when the sensor unit 120 includes a plurality of second sensors RX, as shown in FIG. 1, the sensor receiver TSC may include a plurality of sensing channels (or receiving channels) 222 electrically connected to the respective second sensors RX. The sensor receiver TSC may receive the sensing signal Sse from each of the second sensors RX through the sensing channel 222 and detect touch input by combining the received sensing signal Sse.

Figure 4:
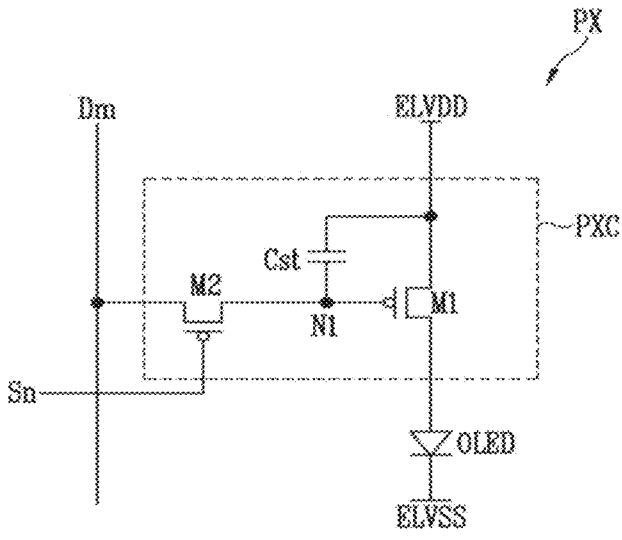
FIG. 4 is a circuit diagram illustrating an embodiment of pixels included in the display device of FIG. 1.

FIG. 4 is a circuit diagram illustrating an embodiment of pixels included in the display device of FIG. 1.

For convenience, FIG. 4 shows a pixel of an organic light emitting display device connected to an n-th (n is a natural number) scan line and an m-th (m is a natural number) data line and including two transistors and one capacitor. However, the pixel according to the disclosure is not limited thereto. For example, a pixel according to another embodiment of the disclosure may further include one or more transistors and/or capacitors. In addition, a pixel according to another embodiment of the disclosure may be implemented as a pixel of another type of display device, for example, a liquid crystal display device.

Referring to FIG. 4, the pixel PX includes a pixel circuit PXC connected to the scan line Sn and the data line Dm, and a light emitting element OLED connected to the pixel circuit PXC. According to an embodiment, the light emitting element OLED may be an organic light emitting diode, but is not limited thereto.

The pixel circuit PXC includes first and second transistors M1 and M2 and a storage capacitor Cst.

According to an embodiment, the first transistor M1 is connected between first power ELVDD and the light emitting element OLED, and includes a gate electrode connected to a first node N1. The first transistor M1 controls a driving current flowing from the first power ELVDD to second power ELVSS via the light emitting element OLED in response to a voltage of the first node N1. In other words, the first transistor M1 may be a driving transistor that controls the driving current of the pixel PX.

According to an embodiment, the second transistor M2 is connected between the data line Dm and the first node N1, and includes a gate electrode connected to the scan line Sn. The second transistor M2 is turned on when a scan signal having a gate-on voltage (for example, a low voltage) is supplied from the scan line Sn. When the second transistor M2 is turned on, the data line Dm and the first node N1 are electrically connected. In other words, the second transistor M2 may be a switching transistor that controls a connection between the pixel PX and the data line Dm.

According to an embodiment, the storage capacitor Cst is connected between the first power ELVDD and the first node N1. The storage capacitor Cst stores a voltage corresponding to a data signal supplied to the first node N1 and maintains the stored voltage for a predetermined period. For example, the storage capacitor Cst may maintain the stored voltage until a data signal of a next frame is supplied. According to an embodiment, a connection position of the storage capacitor Cst may be changed.

According to an embodiment, the light emitting element OLED is connected between the first transistor M1 and the second power ELVSS. The light emitting element OLED may include an anode electrode connected to the first transistor M1 and a cathode electrode connected to the second power ELVSS. The light emitting element OLED emits light with a luminance corresponding to the driving current controlled by the first transistor M1.

FIG. 4 discloses an embodiment in which the first and second transistors M1 and M2 are implemented as P-type transistors, but the disclosure is not limited thereto. For example, according to an embodiment, at least one of the first and second transistors M1 and M2 may be implemented as an N-type transistor, or both of the first and second transistors M1 and M2 may be implemented as N-type transistors.

In FIG. 4, the pixel circuit PXC is shown configured with two transistors and one capacitor. However, the disclosure is not limited to this configuration. According to an embodiment, the pixel circuit PXC may be configured with three or more transistors and two or more capacitors.

Figure 5:
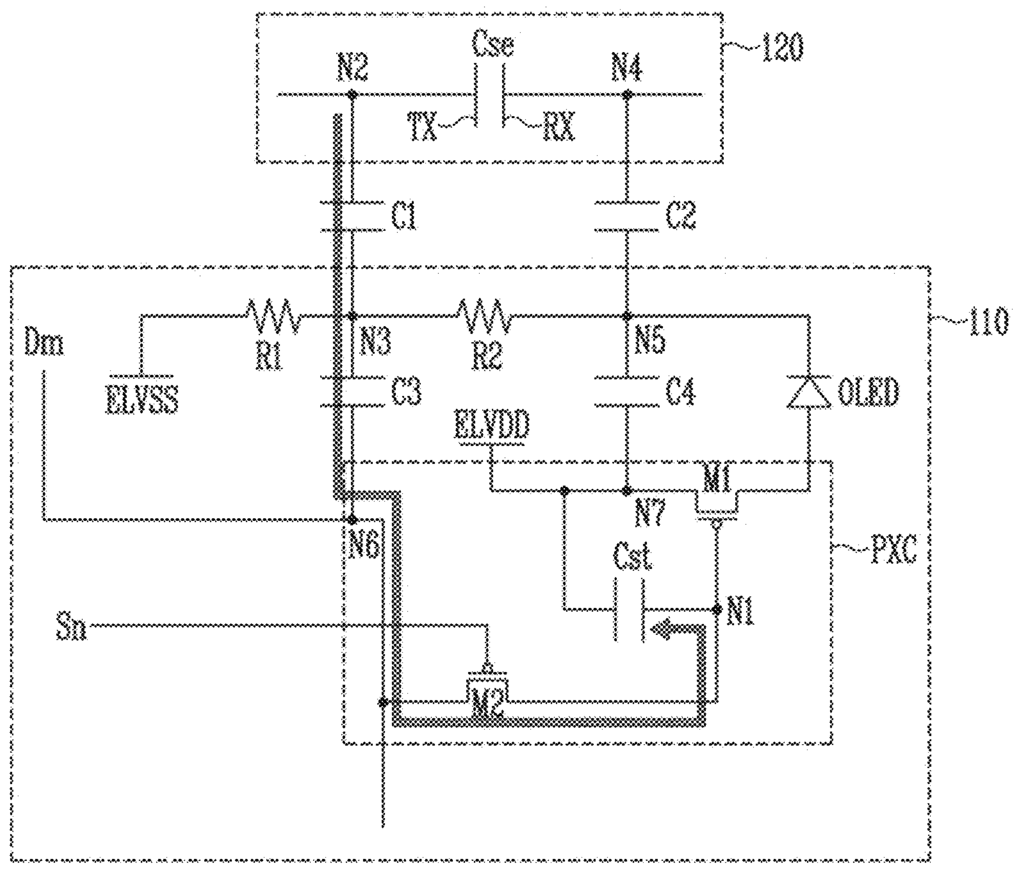
FIG. 5 is a diagram illustrating an embodiment of a display unit and a sensor unit of FIG. 1.

FIG. 5 is a diagram illustrating an embodiment of the display unit and the sensor unit of FIG. 1.

Referring to FIG. 5, the display unit 110 and the sensor unit 120 may be connected through first and second capacitors C1 and C2.

The pixel circuit PXC and the light emitting element OLED of the display unit 110 may be similar to the pixel circuit PXC and the light emitting element OLED of FIG. 4. In addition, the first sensor TX and the second sensor RX of the sensor unit 120 may be similar to the first sensor TX and the second sensor RX of FIG. 3. Accordingly, an overlapping description may be omitted.

The first capacitor C1 may be connected between a second node N2 and a third node N3 connected to the first sensor TX. The second capacitor C2 may be connected between a fourth node N4 and a fifth node N5 connected to the second sensor RX.

The display unit 110 may include the pixel circuit PXC, the light emitting element OLED, a third capacitor C3, a fourth capacitor C4, a first resistor R1, and a second resistor R2.

The third capacitor C3 may be connected between the third node N3 and a sixth node N6. The sixth node N6 may be connected to the data line Dm. The fourth capacitor C4 may be connected between a fifth node N5 and a seventh node N7. The seventh node N7 may be connected to the first power ELVDD.

The first resistor R1 may be connected between the third node N3 and the second power ELVSS, and the second resistor R2 may be connected between the third node N3 and the fifth node N5.

The driving signal received by the first sensor TX of the sensor unit 120 may be transmitted to the storage capacitor Cst through the first capacitor C1, the third capacitor C3, and the second transistor M2, potentially generating noise. In addition, as a magnitude of the driving signal increases, a magnitude of noise transmitted to the storage capacitor Cst may also increase.

Figure 6:
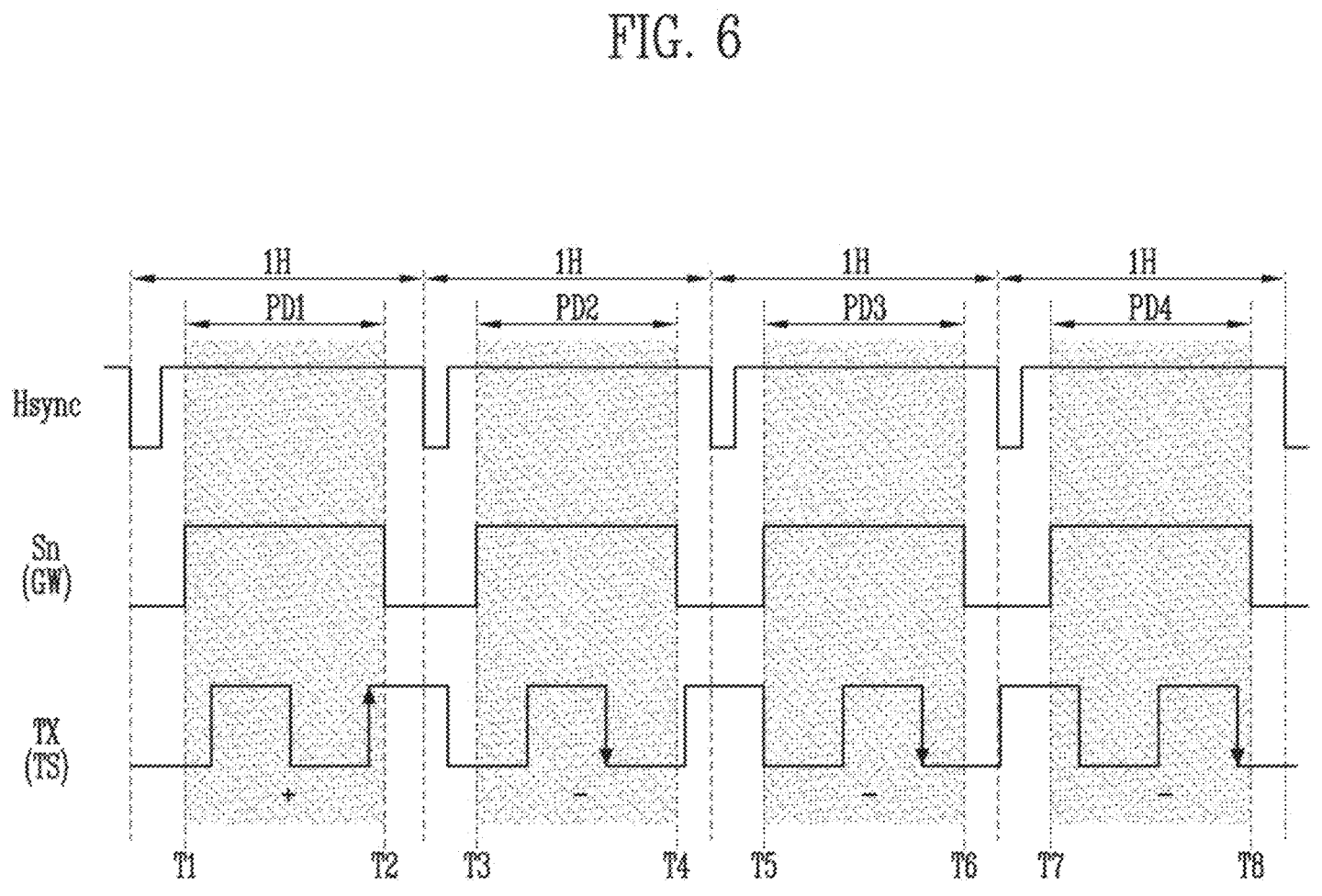

FIG. 6 is a timing diagram illustrating signals applied to the display unit and the sensor unit of FIG. 1.

Referring to FIG. 6, a horizontal synchronization signal Hsync, a scan signal GW, and a driving signal TS applied during a frame period are shown. The frame period refers to the duration in which an image of one screen is displayed on the display unit 110.

A period of the horizontal synchronization signal Hsync may correspond to a horizontal period. The horizontal period 1H refers to the duration in which a data signal is supplied to pixels positioned on one horizontal line (for example, a pixel row connected to the same scan line). For illustrative convenience, four horizontal periods in the frame period are shown within the frame period, but the disclosure is not limited to this and may include a plurality of horizontal periods during the frame period.

During the frame period, the scan signal GW may be supplied to the scan line Sn of FIG. 4. The horizontal period 1H may include a data writing period PD. The data writing period PD may be a period in which the scan signal GW is set to a turn-on level. For example, the scan signal GW may have a high level during the data writing period PD. Setting the scan signal GW to the turn-on level may mean that the scan signal GW is supplied to the pixel circuit PXC, causing the second transistor M2 to be in a turn-on state.

During the frame period, the driving signal TS may be supplied to the first sensor TX of FIG. 3. The driving signal TS may be independently generated regardless of the scan signal GW. Depending on whether a final edge of the driving signal TS in the data writing period PD is a rising edge or a falling edge, it may be determined whether a polarity of the driving signal TS in the data writing period PD is a first polarity + or a second polarity −. The rising edge may refer to a moment when a signal's logic level changes from a low level (for example, '0') to a high level (for example, '1'). The falling edge may refer to a moment when a signal's logic level changes from a high level (for example, '1') to a low level (for example, '0').

More specifically, when the final edge is the rising edge, the polarity of the driving signal TS may be the first polarity +, and when the final edge is the falling edge, the polarity of the driving signal TS may be the second polarity −.

For example, since the final edge of the driving signal TS is the rising edge in a first data writing period PD1 between a first time point T1 and a second time point T2, the driving signal TS is the first polarity + in the first data writing period PD1. Since the final edge of the driving signal TS is the falling edge in a second data writing period PD2 between a third time point T3 and a fourth time point T4, the driving signal TS is the second polarity − in the second data writing period PD2. Since the final edge of the driving signal TS is the falling edge in a third data writing period PD3 between a fifth time point T5 and a sixth time point T6, the driving signal TS is the second polarity − in the third data writing period PD3. Since the final edge of the driving signal TS is the falling edge in a fourth data writing period PD4 between a seventh time point T7 and an eighth time point T8, the driving signal TS is the second polarity—in the fourth data writing period PD4.

As described with reference to FIG. 5, when a luminance change occurs in the display unit 110 due to noise caused by the driving signal TS, the driving signal TS may exhibit both the first polarity + and the second polarity −. When the period in which the driving signal TS consecutively maintains the first polarity + and then the second polarity − is long, a user may easily recognize a flicker.

For example, as shown in FIG. 6, when the period in which the driving signal TS has the first polarity + and the second polarity − irregularly, and the period in which the driving signal TS consecutively maintains the second polarity − is longer than the horizontal period 1H, such as during the second to fourth data writing periods PD2 to PD4, the user may easily recognize the flicker.

To prevent this, the driving signal TS needs to be adjusted so that the period during which the driving signal TS consecutively maintains the first polarity + and the second polarity − is not longer than the horizontal period 1H, ensuring that the flicker is not recognized by the user.

Figure 7:
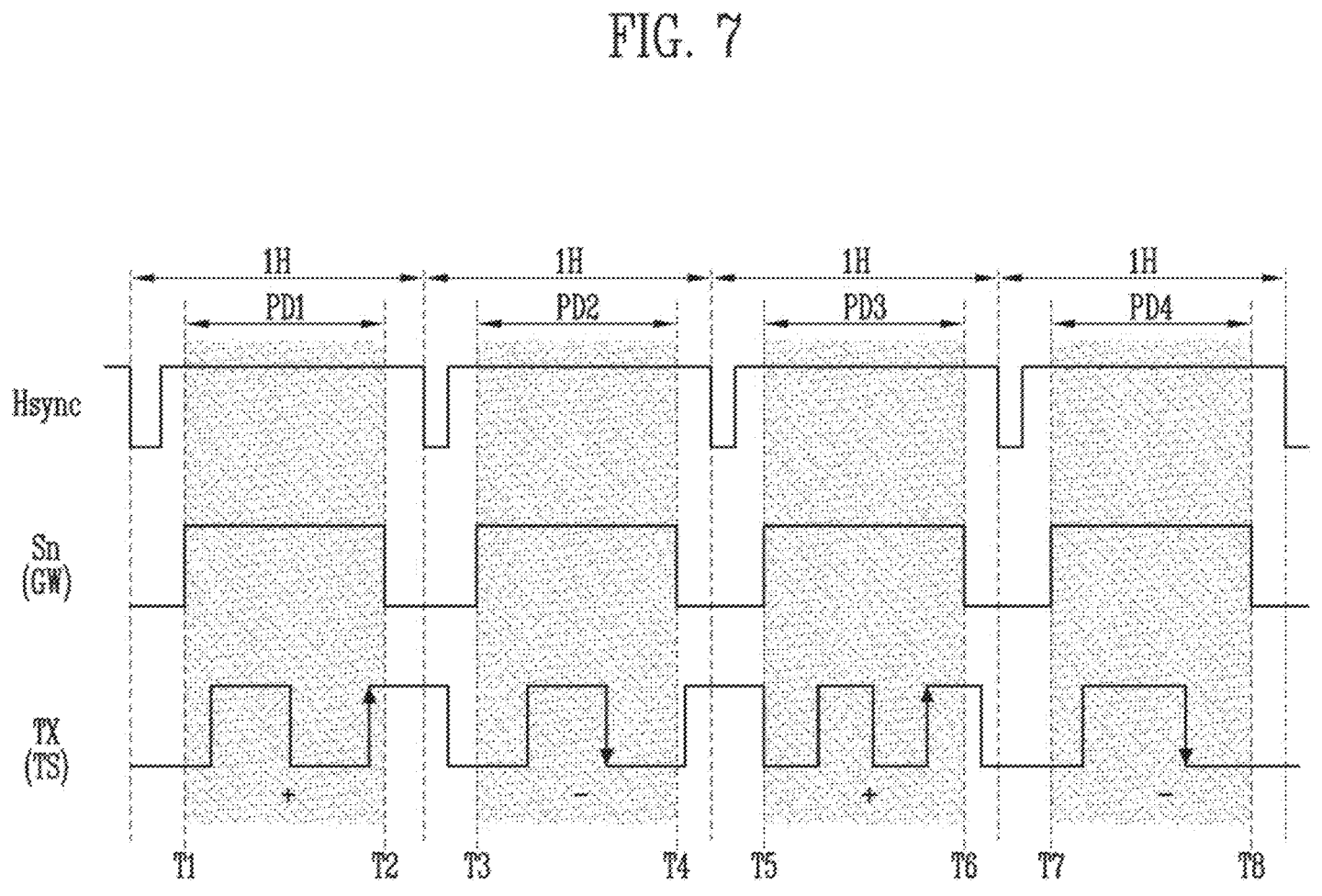

FIG. 7 is a timing diagram illustrating a scan signal and a driving signal according to an embodiment of the disclosure.

Referring to FIG. 7, a driving signal TS with its polarity alternately changed during each data writing period is shown. Since the horizontal synchronization signal Hsync and the scan signal GW are similar to the horizontal synchronization signal Hsync and the scan signal GW of FIG. 6, an overlapping description is omitted.

As the polarity of the driving signal TS is alternately changed during each data writing period, the polarity of the driving signal TS in the first data writing period PD1 differs from that in the second data writing period PD2. Additionally, the polarity of the driving signal TS in the second data writing period PD2 differs from that in the third data writing period PD3. Furthermore, the polarity of the driving signal TS in the third data writing period PD3 differs from that in the fourth data writing period PD4.

When the driving signal TS has the second polarity − in the second data writing period PD2, the duty (e.g., duty cycle) of the driving signal TS may be adjusted so that the driving signal TS has the first polarity + in the third data writing period PD3.

Similarly, when the driving signal TS has the first polarity + in the third data writing period PD3, the duty of the driving signal TS may be adjusted so that the driving signal TS has the second polarity − in the fourth data writing period PD4.

As described above, since the polarity of the driving signal TS alternates during each data writing period, which is shorter than the horizontal period 1H, flicker may not be recognized by the user.

Figure 8:
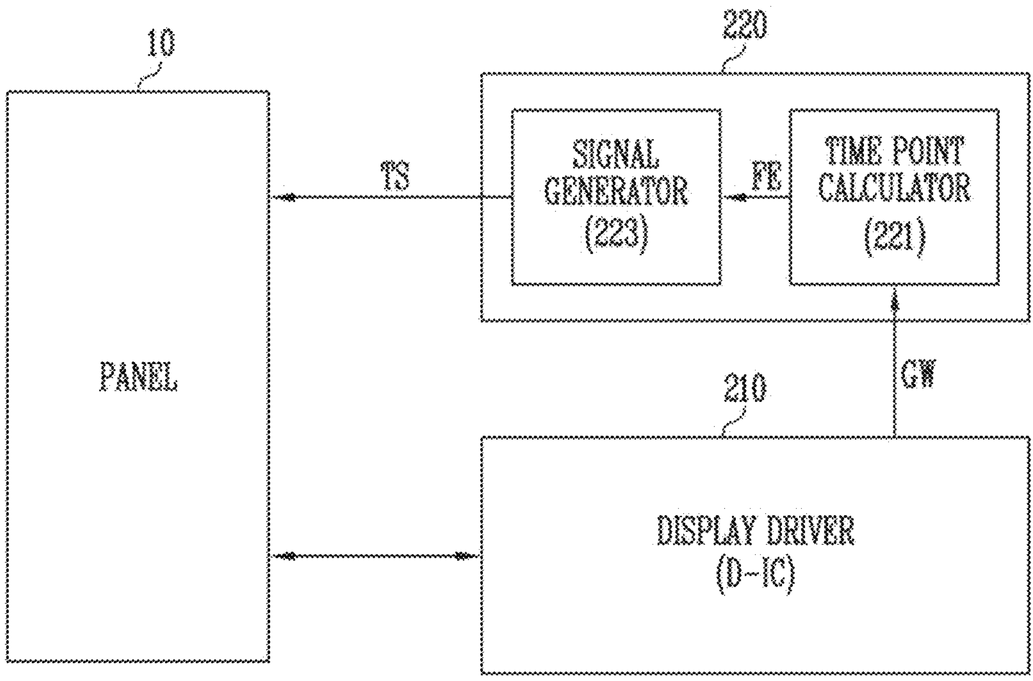
FIG. 8 is a block diagram illustrating a sensor driver according to an embodiment of the disclosure.

FIG. 8 is a block diagram illustrating a sensor driver according to an embodiment of the disclosure.

Referring to FIG. 8, the sensor driver 220 may include a time point calculator 221 and a signal generator 223.

The display driver 210 may output the scan signal GW to the time point calculator 221 during the frame period.

The time point calculator 221 may calculate the data writing period from a rising edge time point and a falling edge time point of the scan signal GW detected during a first horizontal period of the frame period. The rising edge time point may be the moment when the rising edge of the scan signal GW is detected. The falling edge time point may be the moment when the falling edge of the scan signal GW is detected.

For example, referring to the first horizontal period 1H of FIG. 7, the time point calculator 221 may detect that a rising edge time point of the first horizontal period 1H is the first time point T1 and a falling edge time point is the second time point T2. A length of the data writing period (e.g., the first data writing period PD1) may be a length between the first time point T1 and the second time point T2.

The time point calculator 221 may calculate a next falling edge time point FE based on the detected rising edge time point of the scan signal GW and the length of the data writing period during horizontal periods after the first horizontal period. For example, referring to a third horizontal period 1H of FIG. 7, the time point calculator 221 may detect that a rising edge time point of the third horizontal period 1H is the fifth time point T5. The time point calculator 221 may determine that a next falling edge time point FE is the sixth time point T6 based on the fifth time point T5 and the length of the data writing period (e.g., PD3).

The time point calculator 221 may output the next falling edge time point FE to the signal generator 223.

The signal generator 223 may generate a driving signal with an adjusted duty, ensuring that the polarity alternates during each data writing period, based on the next falling edge time point FE.

For example, referring to the third data writing period PD3 of FIG. 7, the signal generator 223 may generate the driving signal TS with an adjusted duty so that the final edge of the driving signal TS is the rising edge before the sixth time point T6. This adjustment is based on the fact that the final edge of the driving signal TS was the falling edge during the second data writing period PD2.

In addition, referring to the fourth data writing period PD4 of FIG. 7, the signal generator 223 may generate the driving signal TS with an adjusted duty so that the final edge of the driving signal TS is the falling edge before the eighth time point T8. This adjustment is based on the fact that the final edge of the driving signal TS was the rising edge during the third data writing period PD3. In other words, the sensor driver 220 may control the duty of the driving signal TS based on the scan signal GW received from the display driver 210.

FIG. 8 is described based on the assumption that the second transistor M2 is set to the turn-on state when the scan signal GW with a logic high level is supplied. However, the disclosure is not limited thereto, and may also apply when the second transistor M2 is set to the turn-on state when the scan signal GW with a logic low level is supplied. For example, the time point calculator 221 may calculate a next rising edge time point based on the detected falling edge time point of the scan signal GW and the length of the data writing period during horizontal periods after the first horizontal period. The signal generator 223 may then generate the driving signal with an adjusted duty, ensuring that the polarity alternates during each data writing period, based on the next rising edge time point.

Figure 9:
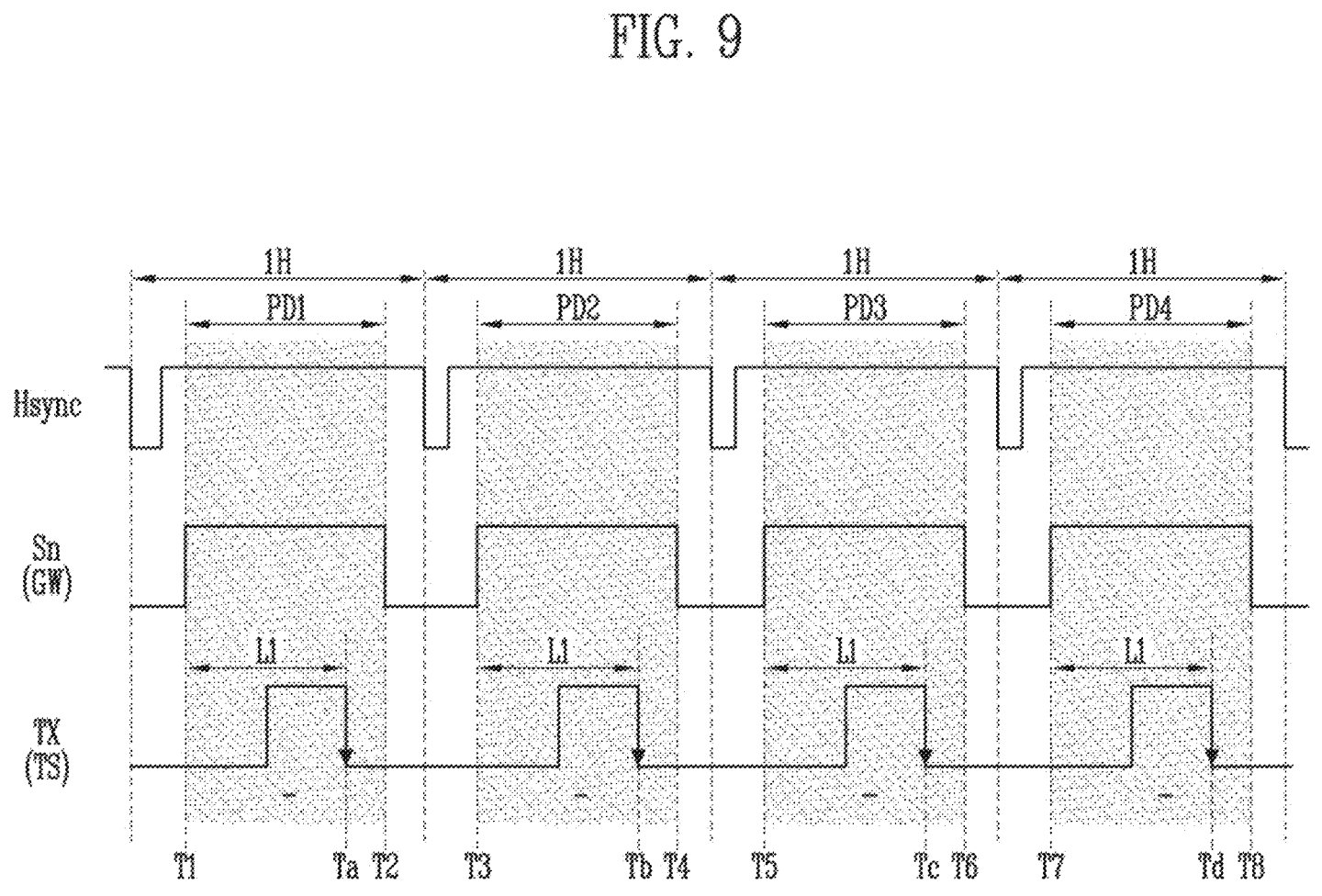

FIG. 9 is a timing diagram illustrating a scan signal and a driving signal according to an embodiment of the disclosure.

Referring to FIG. 9, the driving signal TS having only the second polarity − is shown. Since the horizontal synchronization signal Hsync and the scan signal GW are similar to the horizontal synchronization signal Hsync and the scan signal GW of FIG. 6, an overlapping description is omitted.

Referring to the first to fourth data writing periods PD1 to PD4, the final edge of the driving signal TS is the falling edge. In addition, time points Ta to Td of the final edge are fixed in the first to fourth data writing periods PD1 to PD4. In other words, the time point Ta is a time point when a first period L1 has elapsed from the first time point T1, the time point Tb is a time point when the first period L1 has elapsed from the third time point T3, the time point Tc is a time point when the first period L1 has elapsed from the fifth time point T5, and the time point Td is a time point when the first period L1 has elapsed from the seventh time point T7. A length of the first period L1 may be freely determined according to the user's settings.

Since the final edge of the driving signal TS is always a falling edge and its time point is fixed, the first polarity + and the second polarity – of the driving signal TS may alternate, thereby preventing flicker from recognized by the user.

Figure 10:
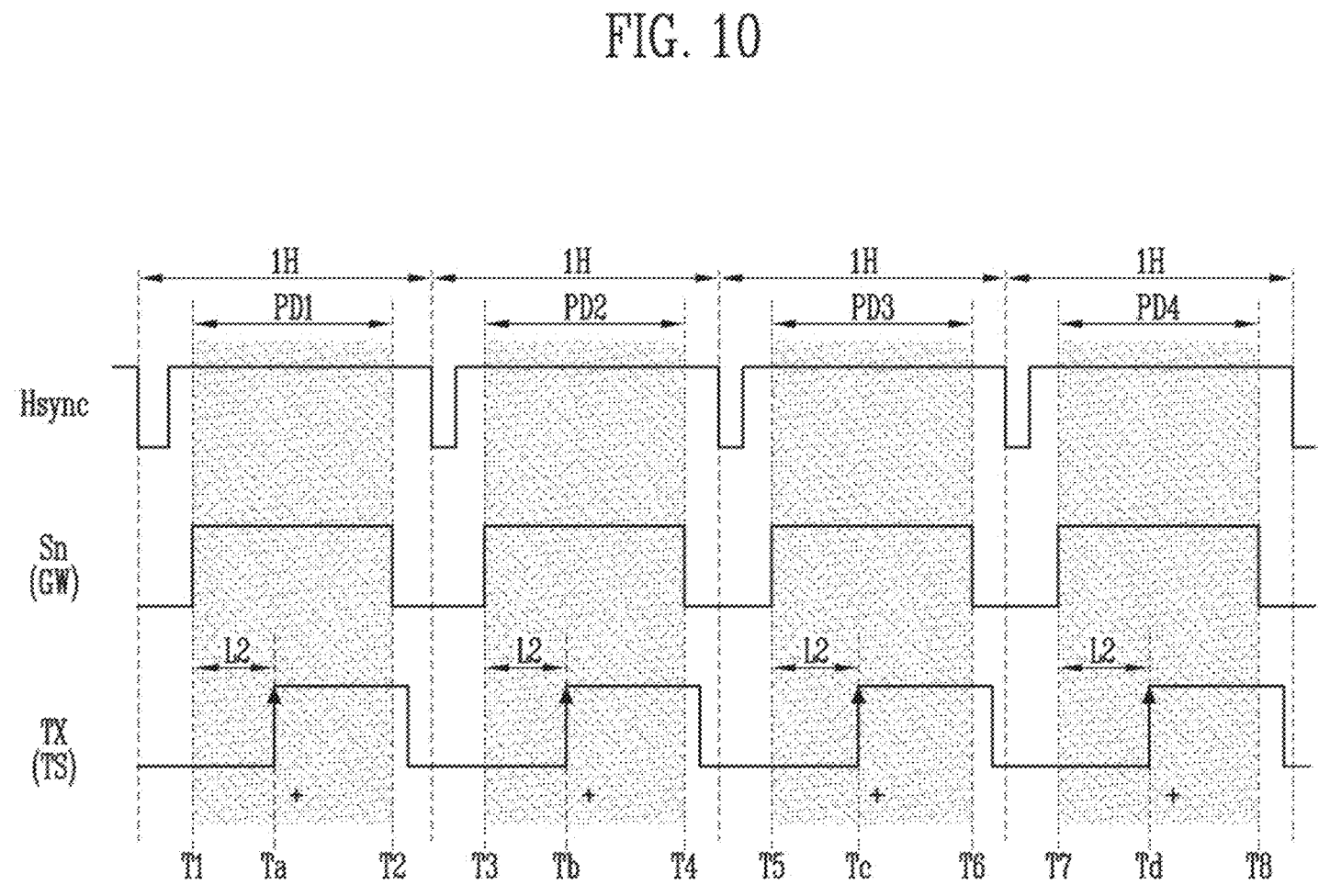

FIG. 10 is a timing diagram illustrating a scan signal and a driving signal according to an embodiment of the disclosure.

Referring to FIG. 10, the driving signal TS having only the first polarity + is shown. Since the horizontal synchronization signal Hsync and the scan signal GW are similar to the horizontal synchronization signal Hsync and the scan signal GW of FIG. 6, an overlapping description is omitted.

Referring to the first to fourth data writing periods PD1 to PD4, the final edge of the driving signal TS is the rising edge. In addition, time points Ta to Td of the final edge are fixed in the first to fourth data writing periods PD1 to PD4. In other words, the time point Ta is a time point when a second period L2 has elapsed from the first time point T1, the time point Tb is a time point when the second period L2 has elapsed from the third time point T3, the time point Tc is a time point when the second period L2 has elapsed from the fifth time point T5, and the time point Td is a time point when the second period L2 has elapsed from the seventh time point T7.

Since the final edge of the driving signal TS is always a rising edge and its time point is fixed, the first polarity + and the second polarity – of the driving signal TS may alternate, thereby preventing flicker from being recognized by the user.

FIGS. 11 to 17 are diagrams illustrating an example configuration of a display device. The reference numerals of FIGS. 11 to 17 and the reference numerals of FIGS. 1 to 10 are independent from each other.

Figure 11:
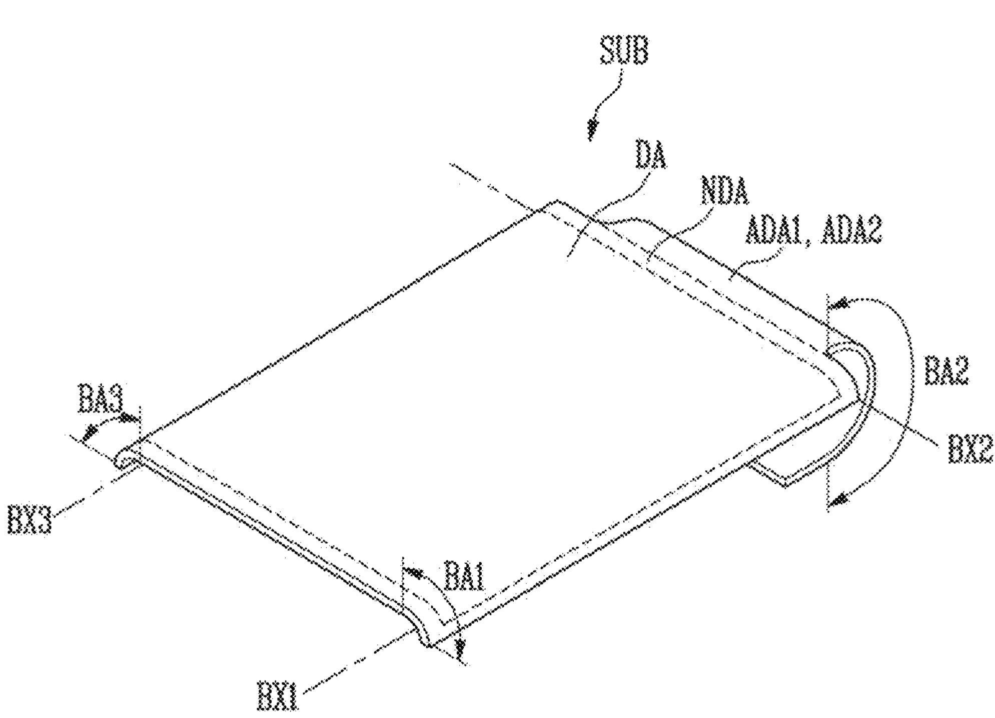
FIGS. 11, 12, 13, 14, 15, 16 and 17 are diagrams illustrating an example configuration of a display device.
Figure 12:
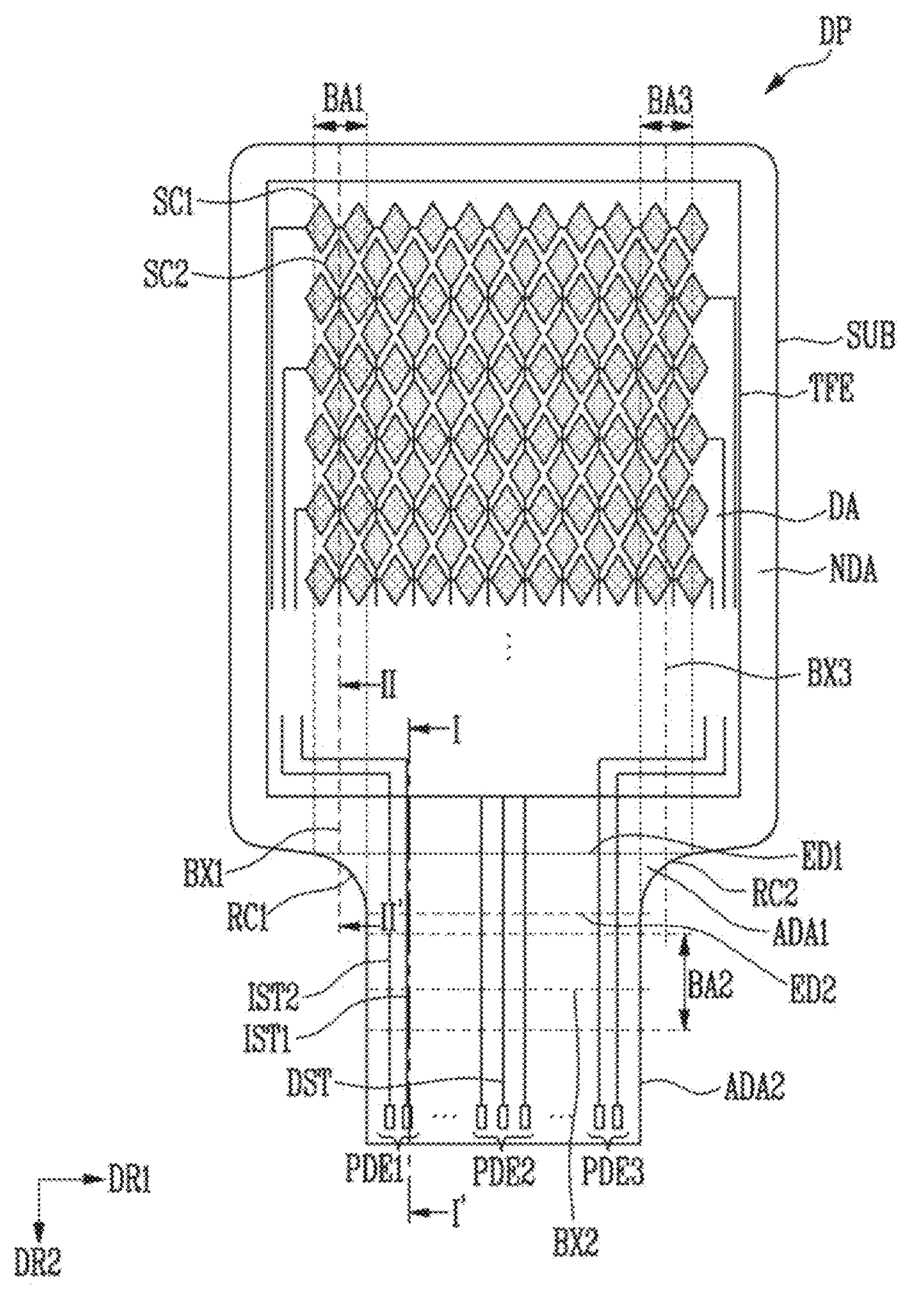

FIG. 11 is a diagram illustrating a substrate according to an embodiment of the disclosure, and FIG. 12 is a diagram illustrating a display device according to an embodiment of the disclosure.

In the following embodiments, a plane may define a position in a first direction DR1 and a second direction DR2, and a height may define a position in a third direction DR3 (refer to FIG. 13). The first direction DR1, the second direction DR2, and the third direction DR3 may be directions orthogonal to each other.

The substrate SUB may include a display area DA, a non-display area NDA, a first additional area ADA1, and a second additional area ADA2.

The display area DA may have a rectangular shape. Each corner of the display area DA may be an angular shape or a curved shape. In addition, in a circular display, the display area DA may have a circular shape. In addition, the display area DA may be configured in various shapes, such as a polygon other than a quadrangle, an ellipse, or the like. As described above, a shape of the display area DA may be customized based on product requirements.

Pixels may be positioned on the display area DA. Each of the pixels may include a light emitting diode or may include a liquid crystal layer according to a type of a display device DP.

The non-display area NDA may surround an outer periphery of the display area DA. For example, the non-display area NDA may have a rectangular shape. Each corner of the non-display area NDA may be an angular shape or a curved shape. FIG. 12 illustrates that each corner of the non-display area NDA has a curved shape. The non-display area NDA may have a circular shape. To achieve a narrow bezel structure, it is beneficial to minimize the non-display area NDA. Therefore, a shape of the non-display area NDA may be similar to the shape of the display area DA.

The first additional area ADA1 may be positioned between the non-display area NDA and the second additional area ADA2. The first additional area ADA1 may be connected to the non-display area NDA at a first boundary ED1. The first additional area ADA1 may be connected to the second additional area ADA2 at a second boundary ED2. Each of the first boundary ED1 and the second boundary ED2 may extend in the first direction DR1.

A width of the first additional area ADA1 may be narrower from the first boundary ED1 to the second boundary ED2. In other words, the width of the first additional area ADA1 in the first direction DR1 may be narrower toward the second direction DR2. Therefore, the first additional area ADA1 may include a curved first side RC1 and a curved second side RC2. The sides RC1 and RC2 may be convex toward an inside of the substrate (for example, a center of the substrate).

FIG. 12 shows that the first additional area ADA1 includes the two sides RC1 and RC2 in the first direction DR1 and a direction opposite to the first direction DR1. In another embodiment, a boundary positioned in the first direction DR1 may coincide with a boundary of the non-display area NDA, and thus, the first additional area ADA1 may include only the first side RC1. In another embodiment, a boundary positioned in the direction opposite to the first direction DR1 may coincide with the boundary of the non-display area NDA, and thus, the first additional area ADA1 may include only the second side RC2.

The second additional area ADA2 may have a rectangular shape. Each corner positioned in the second direction DR2 of the second additional area ADA2 may be an angular shape or a curved shape. FIG. 12 illustrates that each corner positioned in the second direction DR2 of the second additional area ADA2 has an angular shape.

An encapsulation layer TFE may be positioned on the pixels. For example, the encapsulation layer TFE may cover the pixels in the display area DA and a boundary of the encapsulation layer TFE may be positioned in the non-display area NDA. The encapsulation layer TFE may cover light emitting elements and circuit elements of the pixels of the display area DA, thereby protecting them from external moisture or impact.

Sensing electrodes SC1 and SC2 may be positioned on the encapsulation layer TFE. The sensing electrodes SC1 and SC2 may detect touch, hovering, gestures, proximity, and similar actions by a user's body. The sensing electrodes SC1 and SC2 may be designed in different shapes according to various methods such as resistive, capacitive, electro-magnetic (EM), and optical types. For example, if the sensing electrodes SC1 and SC2 are designed as capacitive types, the sensing electrodes SC1 and SC2 may be configured as self-capacitive, mutual-capacitive, or other similar types. Hereinafter, for convenience of description, a case where the sensing electrodes SC1 and SC2 are configured as mutual-capacitive types is described as an example.

When the sensing electrodes SC1 and SC2 are driven using the mutual-capacitive type, the driving signal may be transmitted through a sensing line corresponding to the first sensing electrode SC1, and the sensing signal may be received through a sensing line corresponding to the second sensing electrode SC2, which forms a mutual capacitance with the first sensing electrode SC1. When the user's body is nearby, the mutual capacitance between the first sensing electrode SC1 and the second sensing electrode SC2 may change, allowing the detection of touch based on a difference in the sensing signal caused by this change in mutual capacitance. In another embodiment, the driving signal may be transmitted through the sensing line corresponding to the second sensing electrode SC2, and the sensing signal may be received through the sensing line corresponding to the first sensing electrode SC1, which forms a mutual capacitance with the second sensing electrode SC2.

Pads PDE1, PDE2, and PDE3 may be positioned on the second additional area ADA2. The pads PDE1 and PDE3 may be connected to the sensing electrodes SC1 and SC2 positioned above the encapsulation layer TFE through the sensing lines IST1 and IST2. The pads PDE1 and PDE3 may be connected to an external touch integrated chip (IC). In addition, the pads PDE2 may be connected to the pixels positioned under the encapsulation layer TFE or a driver of the pixels through display lines DST. The driver may include a scan driver, an emission driver, a data driver, and the like. The driver may be positioned under the encapsulation layer TFE or may be positioned in an external display IC connected through the pads PDE2.

When the display device DP is the mutual-capacitive type, a touch IC may transmit the driving signal through the first sensing line IST1 and receive the sensing signal through the second sensing line IST2. In another embodiment, the driving signal may be transmitted through the second sensing line IST2 and the sensing signal may be received through the first sensing line IST1. For reference, when the display device DP is the self-capacitive type, a driving method of the first sensing line IST1 and the second sensing line IST2 may be the same. The display lines DST may include a control line, a data line, a power line, and the like, providing signals so that the pixels may display an image. The signals may be provided from the driver connected to the display lines DL.

FIG. 11 shows a state in which the substrate SUB is bent, and FIG. 12 shows a state in which the substrate SUB is not bent. The display device DP may be bent as shown in FIG. 11 after elements are stacked on the substrate SUB in a state in which the display device DP is not bent as shown in FIG. 12.

The substrate SUB may include a first bending area BA1 extending from the first side RC1 of the first additional area ADA1 to overlap the non-display area NDA. In addition, the first bending area BA1 may be extended to overlap the display area DA. In other words, each of the display area DA, the non-display area NDA, and the first additional area ADA1 may partially overlap the first bending area BA1. The first bending area BA1 may have a width of the first direction DR1 and a length extending in the second direction DR2. A first bending axis BX1 may be defined as a folding line extending in the second direction DR2 from a center of the first bending area BA1. According to an embodiment, the first bending area BA1 may have reduced stress due to the removal of a portion of an insulating layer or the like, unlike other areas around the first bending area BA1. According to an embodiment, the first bending area BA1 may have the same configuration as the other areas around first bending area BA1.

The substrate SUB may include a third bending area BA3 extending from the second side RC2 of the first additional area ADA1 to overlap the non-display area NDA. In addition, the third bending area BA3 may extend to overlap the display area DA. In other words, each of the display area DA, the non-display area NDA, and the first additional area ADA1 may partially overlap the third bending area BA3. The third bending area BA3 may have a width of the first direction DR1 and a length extending in the second direction DR2. A third bending axis BX3 may be defined as a folding line extending in the second direction DR2 from a center of the third bending area BA3. According to an embodiment, the third bending area BA3 may have reduced stress due to the removal of a portion of the insulating layer or the like, unlike other areas around the third bending area BA3. According to an embodiment, the third bending area BA3 may have the same configuration as the other areas around the third bending area BA3.

The second additional area ADA2 may include a second bending area BA2. The second bending area BA2 may have a width of the second direction DR2 and a length extending in the first direction DR1. A second bending axis BX2 may be defined as a folding line extending in the first direction DR1 from a center of the second bending area BA2. According to an embodiment, the second bending area BA2 may have reduced stress due to the removal of a portion of the insulating layer or the like, unlike other areas around the second bending area BA2. According to an embodiment, the second bending area BA2 may have the same configuration as the other areas around the second bending area BA2.

The first to third bending areas BA1, BA2, and BA3 may not overlap with each other.

Here, the term "folded" is intended to mean that a shape is not fixed and may be modified from its original form to another, including being folded, curved, or rolled along one or more bending axes. A side bezel width of the first direction DR1 and the direction opposite to the first direction DR1 of the display device DP may be reduced by the first and third bending areas BA1 and BA3. In addition, a side bezel width of the second direction DR2 of the display device DP may be reduced by the second bending area BA2.

Figure 13:
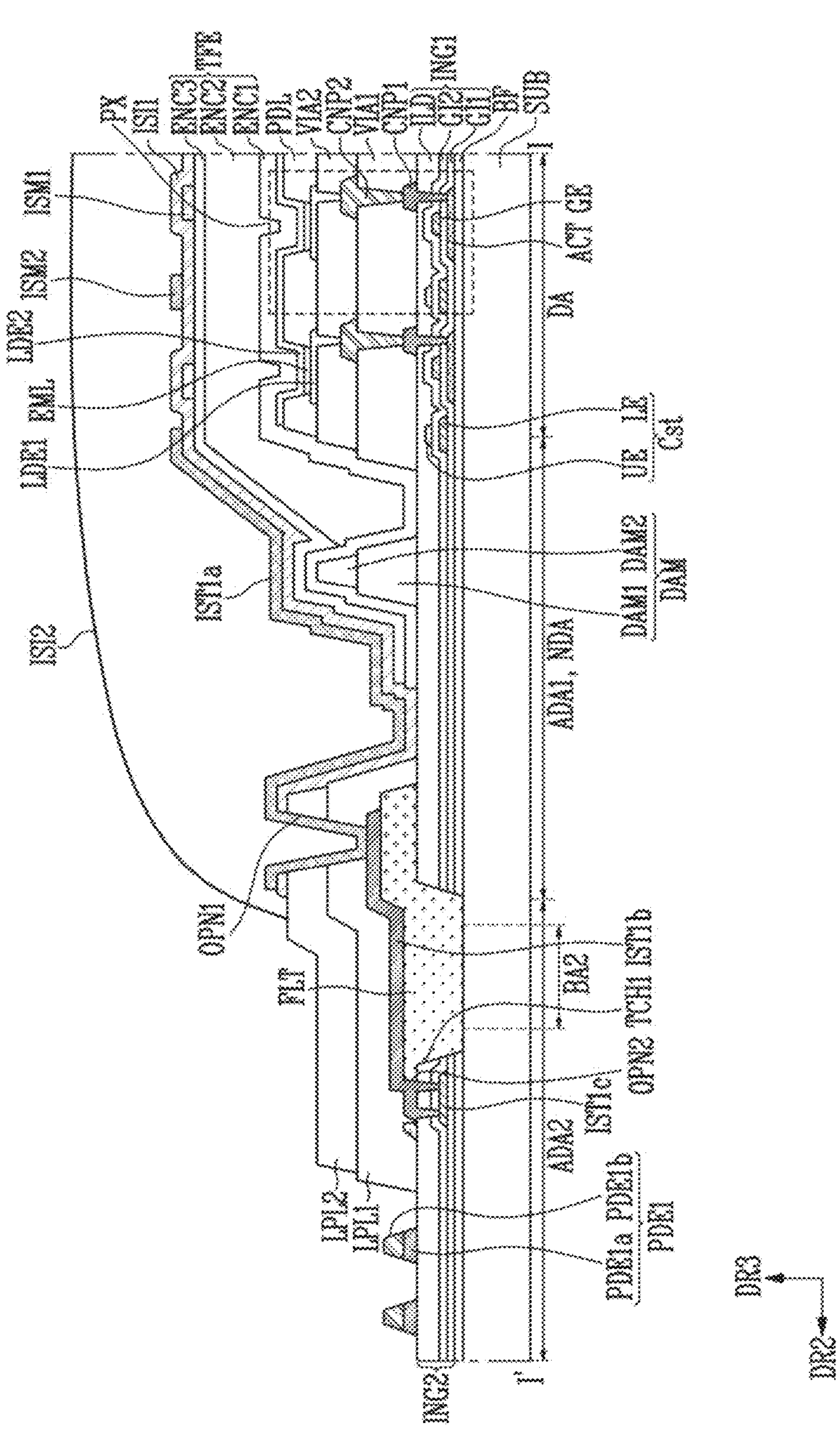

FIG. 13 is an embodiment of a cross-section taken along line I-I' of FIG. 12. It is assumed that the line I-I' of FIG. 12 passes through the first pad PDE1 and the first sensing line IST1.

First, the display area DA is described. In an embodiment of the disclosure, pixels PX are provided in the display area DA. Each pixel PX may include a transistor connected to a corresponding line of the display lines DST, a light emitting element connected to the transistor, and a capacitor Cst. In FIG. 13, for convenience of description, one transistor, one light emitting element, and one capacitor Cst are shown for one pixel PX as an example.

The substrate SUB may be formed of an insulating material such as glass, or resin. In addition, the substrate SUB may be formed of a material having flexibility as allowing it to be bent or folded, and may have a single layer structure or a multiple layer structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, a material forming the substrate SUB may be variously changed, and may be formed of fiber reinforced plastic (FRP) or the like.

For example, when the substrate SUB has the multiple layer structure, inorganic materials such as silicon nitride, silicon oxide, and silicon oxynitride may be interposed between a plurality of layers in a single layer or a plurality of layers.

A buffer layer BF may cover the substrate SUB. The buffer layer BF may prevent an impurity from diffusing into a channel of the transistor. The buffer layer BF may be an inorganic insulating layer formed of an inorganic material. For example, the buffer layer BF may be formed of silicon nitride, silicon oxide, silicon oxynitride or the like, and may be omitted depending on the material of the substrate SUB and a process condition. According to an embodiment, a barrier layer may be further provided.

An active layer ACT may be positioned on the buffer layer BF. The active layer ACT may be patterned to configure the channel, a source electrode, and a drain electrode of the transistor, or configure a line. The active layer ACT may be formed of a semiconductor material. The active layer ACT may be a semiconductor pattern formed of polysilicon, amorphous silicon, an oxide semiconductor, or the like. The channel of the transistor may be a semiconductor pattern which is not doped with an impurity, and may be an intrinsic semiconductor. The source electrode, the drain electrode, and the line may be a semiconductor pattern doped with an impurity. As the impurity, an impurity such as an n-type impurity, a p-type impurity, and other metals may be used.

A first gate insulating layer GI1 may cover the active layer ACT. The first gate insulating layer GI1 may be an inorganic insulating layer formed of an inorganic material. As the inorganic material, an inorganic insulating material such as polysiloxane, silicon nitride, silicon oxide, or silicon oxynitride may be used.

A gate electrode GE of the transistor and a lower electrode LE of the capacitor Cst may be positioned on the first gate insulating layer GI1. The gate electrode GE may overlap an area corresponding to the channel CH.

The gate electrode GE and the lower electrode LE may be formed of a metal. For example, the gate electrode GE may be formed of at least one of a metal such as gold (Au), silver (Ag), aluminum (Al), molybdenum (Mo), chromium (Cr), titanium (Ti), nickel (Ni), neodymium, or copper (Cu), or an alloy of the metals. In addition, the gate electrode GE may be formed of a single layer, but is not limited thereto, and may be formed of multiple layers in which two or more materials of metals and alloys are stacked.

A second gate insulating layer GI2 may cover the gate electrode GE and the lower electrode LE. The second gate insulating layer GI2 may be an inorganic insulating layer formed of an inorganic material. As the inorganic material, polysiloxane, silicon nitride, silicon oxide, silicon oxynitride, and the like may be used.

An upper electrode UE of the capacitor Cst may be positioned on the second gate insulating layer GI2. The upper electrode UE of the capacitor Cst may be formed of a metal. For example, the upper electrode UE may be formed of at least one of a metal such as gold (Au), silver (Ag), aluminum (Al), molybdenum (Mo), chromium (Cr), titanium (Ti), nickel (Ni), neodymium, or copper (Cu), or an alloy of metals. In addition, the upper electrode UE may be formed of a single layer, but is not limited thereto, and may be formed of multiple layers in which two or more materials of metals and alloys are stacked.

The lower electrode LE and the upper electrode UE may configure the capacitor Cst with the second gate insulating layer GI2 interposed therebetween. In FIG. 13, the capacitor Cst is shown as a two layer electrode structure of the lower electrode LE and the upper electrode UE. However, in another embodiment, the capacitor Cst may be configured as a three layer electrode structure using the active layer ACT, a three layer electrode structure using an electrode of the same layer as a first connection pattern CNP1, or an electrode structure of four or more layers.

An interlayer insulating layer ILD may cover the upper electrode UE. The interlayer insulating layer ILD may be an inorganic insulating layer formed of an inorganic material. As the inorganic material, polysiloxane, silicon nitride, silicon oxide, silicon oxynitride, and the like may be used.

In the present embodiment, for convenience of description, the first gate insulating layer GI1, the second gate insulating layer GI2, and the interlayer insulating layer ILD may be referred to as a first insulating layer group ING1. The first insulating layer group ING1 may cover a portion of the transistor. According to an embodiment, the first insulating layer group ING1 may further include the buffer layer BF.

The first connection pattern CNP1 may be positioned on the interlayer insulating layer ILD. The first connection pattern CNP1 may be in contact with each of the source electrode and the drain electrode of the active layer ACT through a contact hole formed through the interlayer insulating layer ILD, the second gate insulating layer GI2, and the first gate insulating layer GI1.

The first connection pattern CNP1 may be formed of a metal. For example, the source electrode and the drain electrode may be formed of at least one of a metal such as gold (Au), silver (Ag), aluminum (Al), molybdenum (Mo), chromium (Cr), titanium (Ti), nickel (Ni), neodymium, or copper (Cu), or an alloy of metals.

In addition, according to an embodiment, a passivation layer may cover the first connection pattern CNP1. The passivation layer may be an inorganic insulating layer formed of an inorganic material. As the inorganic material, polysiloxane, silicon nitride, silicon oxide, silicon oxynitride, and the like may be used.

A first via layer VIA1 may cover the passivation layer or the transistor. The first via layer VIA1 may be an organic insulating layer formed of an organic material. As the organic material, an organic insulating material such as a polyacrylic compound, a polyimide compound, a fluorocarbon compound such as Teflon, or a benzocyclobutene compound may be used. The organic layer may be deposited by a method such as evaporation.

A second connection pattern CNP2 may be connected to the first connection pattern CNP1 through an opening of the first via layer VIA1. The second connection pattern CNP2 may be formed of at least one of a metal such as gold (Au), silver (Ag), aluminum (Al), molybdenum (Mo), chromium (Cr), titanium (Ti), nickel (Ni), neodymium, or copper (Cu), or an alloy of metals.

A second via layer VIA2 may cover the first via layer VIA1 and the second connection pattern CNP2. The second via layer VIA2 may be an organic insulating layer formed of an organic material. As the organic material, an organic insulating material such as a polyacrylic compound, a polyimide compound, a fluorocarbon compound such as Teflon, or a benzocyclobutene compound may be used.

A first light emitting element electrode LDE1 may be connected to the second connection pattern CNP2 through an opening of the second via layer VIA2. Here, the first light emitting element electrode LDE1 may be an anode of the light emitting element according to an embodiment.

According to an embodiment, a configuration of the second via layer VIA2 and the second connection pattern CNP2 may be omitted, and the first light emitting element electrode LDE1 may be directly connected to a first contact electrode through the opening of the first via layer VIA1.

The first light emitting element electrode LDE1 may be formed of a metal layer such as Ag, Mg, Al, Pt, Pd, Au, Ni, Nd, Ir, Cr, or an alloy thereof, indium tin oxide (ITO), indium zinc oxide (IZO), zinc oxide (ZnO), indium tin zinc oxide (ITZO), and/or the like. The first light emitting element electrode LDE1 may be formed of one type of metal, but is not limited thereto, and may be formed of two or more types of metals, for example, an alloy of Ag and Mg.

The first light emitting element electrode LDE1 may be formed of a transparent conductive layer when an image is to be displayed in a downward direction of the substrate SUB. Conversely, the first light emitting element electrode LDE1 may be formed of a metal reflective layer and/or a transparent conductive layer when an image is to be displayed in an upward direction of the substrate SUB.

A pixel defining layer PDL for partitioning an emission area of each pixel PX is provided on the substrate SUB on which the first light emitting element electrode LDE1 and the like are formed. The pixel defining layer PDL may be an organic insulating layer formed of an organic material. As the organic material, an organic insulating material such as a polyacrylic compound, a polyimide compound, a fluorocarbon compound such as Teflon, or a benzocyclobutene compound may be used.

The pixel defining layer PDL may expose an upper surface of the first light emitting element electrode LDE1 and may protrude from the substrate SUB along a periphery of the pixel PX. A light emitting layer EML may be provided in an area of the pixel PX surrounded by the pixel defining layer PDL.

The light emitting layer EML may include a low molecular material or a high molecular material. Examples of the low molecular material may include copper phthalocyanine (CuPc), N,N-di (naphthalen-1-yl)-N, N'-diphenyl-benzidine (N,N'-Di(naphthalene-1-yl)-N, N'-diphenyl-benzidine (NPB), tris-8-hydroxyquinoline aluminum (Alq3), and the like. These materials may be formed by a vacuum deposition method. Examples of the high molecular material may include PEDOT, poly-phenylenevinylene (PPV), polyfluorene, and the like.

The light emitting layer EML may be provided as a single layer, but may be provided as multiple layers including various functional layers. When the light emitting layer EML is provided with multiple layers, the light emitting layer EML may have a structure in which a hole injection layer, a hole transport layer, an emission layer, an electron transport layer, an electron injection layer, and the like are stacked in a single or composite structure. The light emitting layer EML may be formed by a screen printing method, an inkjet printing method, a laser induced thermal imaging (LITI) method, or the like.

According to an embodiment, at least a portion of the light emitting layer EML may be integrally formed over a plurality of first light emitting element electrodes LDE1. Alternatively, the light emitting layer EML may be individually provided to correspond to the plurality of first light emitting element electrodes LDE1.

A second light emitting element electrode LDE2 may be provided on the light emitting layer EML. The second light emitting element electrode LDE2 may be provided for each pixel PX, but may be provided to cover most of the display area DA and may be shared by the plurality of pixels PX.

The second light emitting element electrode LDE2 may be used as a cathode or an anode according to an embodiment. When the first light emitting element electrode LDE1 is the anode, the second light emitting element electrode LDE2 may be used as the cathode. When the first light emitting element electrode LDE1 is the cathode, the second light emitting element electrode LDE2 may be used as the anode.

The second light emitting element electrode LDE2 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO). In an embodiment of the disclosure, the second light emitting element electrode LDE2 may be formed of multiple layers of two or more layers including a metal thin film, and for example, the second light emitting element electrode LDE2 may be formed of triple layers of ITO/Ag/ITO.

The second light emitting element electrode LDE2 may be formed of a metal reflective layer and/or a transparent conductive layer when an image is to be displayed in a downward direction of the substrate SUB, and the second light emitting element electrode LDE2 may be formed of a transparent conductive layer when an image is to be displayed in an upward direction of the substrate SUB.

A set of the first light emitting element electrode LDE1, the light emitting layer EML, and the second light emitting element electrode LDE2 may be referred to as a light emitting element.

The encapsulation layer TFE may be provided on the second light emitting element electrode LDE2. The encapsulation layer TFE may be formed of a single layer, but may also be formed of multiple layers. In the present embodiment, the encapsulation layer TFE may be formed of first to third encapsulation layers ENC1, ENC2, and ENC3. The first to third encapsulation layers ENC1, ENC2 and ENC3 may be formed of an organic material and/or an inorganic material. The third encapsulation layer ENC3 positioned at an outermost periphery may be formed of an inorganic material. For example, the first encapsulation layer ENC1 may be an inorganic layer formed of an inorganic material, the second encapsulation layer ENC2 may be an organic layer formed of an organic material, and the third encapsulation layer ENC3 may be an inorganic layer formed of an inorganic material. The penetration of moisture or oxygen into the inorganic material is less than that into the organic material. However, due to the low elasticity or flexibility of the inorganic material, the inorganic material is more prone to cracking. To prevent the propagation of cracks, the first encapsulation layer ENC1 and the third encapsulation layer ENC3 can be formed with the inorganic material while the second encapsulation layer ENC2 is formed with the organic material. Here, a layer formed of the organic material, in other words, the second encapsulation layer ENC2, may be completely covered by the third encapsulation layer ENC3, ensuring that its edges are not exposed to the outside. As the organic material, an organic insulating material such as a polyacrylic compound, a polyimide compound, a fluorocarbon compound such as Teflon, or a benzocyclobutene compound may be used. As the inorganic material, polysiloxane, silicon nitride, silicon oxide, silicon oxynitride, or the like may be used.

The light emitting layer EML forming the light emitting element may be easily damaged by moisture or oxygen from the outside. The encapsulation layer TFE protects the light emitting elements by covering the light emitting layer EML. The encapsulation layer TFE may cover the display area DA and may extend to the non-display area NDA outside the display area DA. However, insulating layers made from organic material offer advantages in terms of flexibility and elasticity, but they are more susceptible to moisture and oxygen penetration compared to insulating layers made from inorganic material. In an embodiment of the disclosure, to prevent moisture or oxygen from penetrating through insulating layers formed of organic material, the ends of these insulating layers may be covered by insulating layers formed of inorganic material, ensuring they are not exposed to the outside. For example, the first via layer VIA1, the second via layer VIA2, and the pixel defining layer PDL, which are formed of an organic material, do not extend continuously to the non-display area NDA, and may be covered by the first encapsulation layer ENC1. Therefore, an upper surface of the pixel defining layer PDL and sides of the first via layer VIA1, the second via layer VIA2, and the pixel defining layer PDL may be prevented from being exposed to the outside by being sealed by the encapsulation layer TFE including the inorganic material.

However, the structure and material composition of the encapsulation layer TFE are not limited to the aforementioned configuration and can be varied. For example, the encapsulation layer TFE may include a plurality of organic material layers and a plurality of inorganic material layers which are alternately stacked.

A first sensing electrode layer ISM1 may be positioned on the encapsulation layer TFE. According to an embodiment, an additional buffer layer may be positioned between the first sensing electrode layer ISM1 and the encapsulation layer TFE. The first sensing electrode layer ISM1 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO).

The first sensing insulating layer ISI1 may exist on the first sensing electrode layer ISM1. The first sensing insulating layer ISI1 may be an inorganic insulating layer formed of an inorganic material. As the inorganic material, an inorganic insulating material such as polysiloxane, silicon nitride, silicon oxide, silicon oxynitride, and the like may be used.

A second sensing electrode layer ISM2 may be present on the first sensing insulating layer ISI1. The second sensing electrode layer ISM2 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO).

A configuration of various input sensors using the first sensing electrode layer ISM1, the first sensing insulating layer ISI1, and the second sensing electrode layer ISM2 is described later with reference to FIGS. 15 to 17.

In the embodiment of FIG. 13, the second sensing electrode layer ISM2 may be patterned to form a first pattern IST1*a* of the first sensing line IST1.

The second sensing insulating layer ISI2 may be positioned on the second sensing electrode layer ISM2. The second sensing insulating layer ISI2 may be configured of an organic layer. For example, as the organic material, an organic insulating material such as a polyacrylic compound, a polyimide compound, a fluorocarbon compound such as Teflon, or a benzocyclobutene compound may be used. For example, the second sensing insulating layer ISI2 may be formed of polymethyl methacrylate, polydimethylsiloxane, polyimide, acrylate, polyethylene terephthalate, polyethylene naphthalate, or the like.

Next, the non-display area NDA, the first additional area ADA1, and the second additional area ADA2 are described. Since the distinction between the non-display area NDA and the first additional area ADA1 is not provided in the cross-sectional view of FIG. 13, the non-display area NDA and the first additional area ADA1 are not separately described. In the following description of the non-display area NDA and the second additional area ADA2, previously described content is either omitted or briefly described to avoid repetition.

A dam DAM may be positioned at a boundary of the second encapsulation layer ENC2. For example, the dam DAM may be positioned between a planarization layer FLT and the second encapsulation layer ENC2. The dam DAM may be a multiple layer structure and may include, for example, a first dam DAM1 and a second dam DAM2. For example, the first and second dams DAM1 and DAM2 may be formed of an organic material. Each of the first and second dams DAM1 and DAM2 may correspond to any one of the first via layer VIA1, the second via layer VIA2, and the pixel defining layer PDL. For example, when the first dam DAM1 is formed of the same material through the same process as the first via layer VIA1, the second dam DAM2 may be formed of the same material through the same process as the second via layer VIA2 or the pixel defining layer PDL. In another example, when the first dam DAM1 is formed of the same material through the same process as the second via layer VIA2, the second dam DAM2 may be formed of the same material through the same process as the pixel defining layer PDL. In addition, when a spacer is formed on the pixel defining layer PDL of the display area DA, the dam DAM may also be formed using the same material as the spacer.

The dam DAM prevents the highly fluid organic material of the second encapsulation layer ENC2 from overflowing during a process. The first and third encapsulation layers ENC1 and ENC3 formed of the inorganic material may cover and extend over the dam DAM, thereby increasing adhesion to the substrate SUB or other layers on the substrate SUB.

The first pad PDE1 may be positioned on the substrate SUB, and may be spaced apart from the planarization layer FLT. The first pad PDE1 may be supported by a second insulating layer group ING2. Insulating layers of the second insulating layer group ING2 may correspond to insulating layers of the first insulating layer group ING1, respectively. The first pad PDE1 may include a first pad electrode PDE1*a* and a second pad electrode PDE1*b*. The first pad electrode PDE1*a* may be formed of the same material as the first connection pattern CNP1. The second pad electrode PDE1*b* may be formed of the same material as the second connection pattern CNP2.

The planarization layer FLT may be positioned on the substrate SUB, and may be spaced apart from an area covered by the encapsulation layer TFE. The planarization layer FLT may be an organic insulating layer formed of an organic material. As the organic material, an organic insulating material such as a polyacrylic compound, a polyimide compound, a fluorocarbon compound such as Teflon, a benzocyclobutene compound, or the like may be used.

In the present embodiment, the planarization layer FLT may be formed before the formation of the first connection pattern CNP1 after the formation of the interlayer insulating layer ILD. Therefore, the planarization layer FLT and the first via layer VIA1 may be formed through different processes. According to an embodiment, the planarization layer FLT and the first via layer VIA1 may include different organic materials.

One end of the planarization layer FLT may cover the first insulating layer group ING1. In addition, a portion of the planarization layer FLT corresponding to the second bending area BA2 may fill a first trench TCH1 between the first insulating layer group ING1 and the second insulating layer group ING2.

Since inorganic insulating layers have higher rigidity and lower flexibility compared to organic insulating layers, they are more prone to cracking. When cracks occur in the inorganic insulating layers, they may propagate to the lines on these layers, potentially leading to defects such as line disconnection.

Therefore, as shown in FIG. 13, the first trench TCH1 may be formed by removing the inorganic insulating layers from the second bending area BA2, and the first insulating layer group ING1 and the second insulating layer group ING2 may be distinguished. In the present embodiment, all of the inorganic insulating layers corresponding to an area of the first trench TCH1 are removed, but in another embodiment, some inorganic insulating layers may remain. In this case, the remaining inorganic insulating layers may include a slit to disperse a bending stress.

A second pattern IST1*b* of the first sensing line IST1 may extend on the planarization layer FLT and may be electrically connected to the first pad PDE1. In the present embodiment, the second pattern IST1*b* may be formed from the same material and through the same process as the first connection pattern CNP1.

A first line protective layer LPL1 may cover the planarization layer FLT and the second pattern IST1*b*. In addition, a second line protective layer LPL2 may cover the first line protective layer LPL1. According to an embodiment, the second line protective layer LPL2 may be omitted. The first and second line protective layers LPL1 and LPL2 may be formed of an organic material. Each of the first and second line protective layers LPL1 and LPL2 may correspond to any one of the first via layer VIA1, the second via layer VIA2, and the pixel defining layer PDL. For example, when the first line protective layer LPL1 is formed of the same material through the same process as the first via layer VIA1, the second line protective layer LPL2 may be formed of the same material through the same process as the second via layer VIA2 or the pixel defining layer PDL. In another example, when the first line protective layer LPL1 is formed of the same material through the same process as the second via layer VIA2, the second line protective layer LPL2 may be formed of the same material through the same process as the pixel defining layer PDL.

The first and second line protective layers LPL1 and LPL2 and the first sensing insulating layer ISI1 may include a first opening OPN1 that exposes the second pattern IST1*b*.

The first pattern IST1*a* may be connected to the second pattern IST1*b* through the first opening OPN1. According to the present embodiment, a height of the first pattern IST1*a* positioned on one end of the first insulating layer group ING1 and the planarization layer FLT may be greater than a height of the second pattern IST1*b* positioned on the planarization layer FLT corresponding to the first trench TCH1.

Therefore, the first pattern IST1*a* and the second pattern IST1*b* may be directly connected to each other without another bridge line. Since a bridge line is not present, connection reliability between the first pattern IST1*a* and the second pattern IST1*b* is improved. In addition, since a length of the non-display area NDA may be reduced by a length of the bridge line, a dead space is reduced and a thin bezel is easily implemented.

A third pattern IST1*c* of the first sensing line IST1 may connect the first pad PDE1 and the second pattern ISTb to each other. The third pattern IST1*c* may be formed of the same material through the same process as the gate electrode GE of the transistor. According to an embodiment, the third pattern IST1*c* may be formed of the same material through the same process as the upper electrode UE. According to an embodiment, an odd-numbered third pattern IST1*c* may be formed from the same material and through the same process as the gate electrode GE of the transistor, while an even-numbered third pattern IST1*c* may be formed from the same material and through the same process as the upper electrode UE. On the contrary, the even-numbered third pattern IST1*c* may be formed from the same material and through the same process as the gate electrode GE of the transistor and the odd-numbered third pattern IST1*c* may be formed from the same material and through the same process as the upper electrode UE. Therefore, the issue of short circuits between adjacent lines may be more efficiently prevented.

The second insulating layer group ING2 may include a second opening OPN2 that exposes the third pattern IST1*c*. In addition, the planarization layer FLT may include an opening corresponding to the second opening OPN2. The second pattern IST1*b* may be connected to the third pattern IST1*c* through the second opening OPN2.

Figure 14:
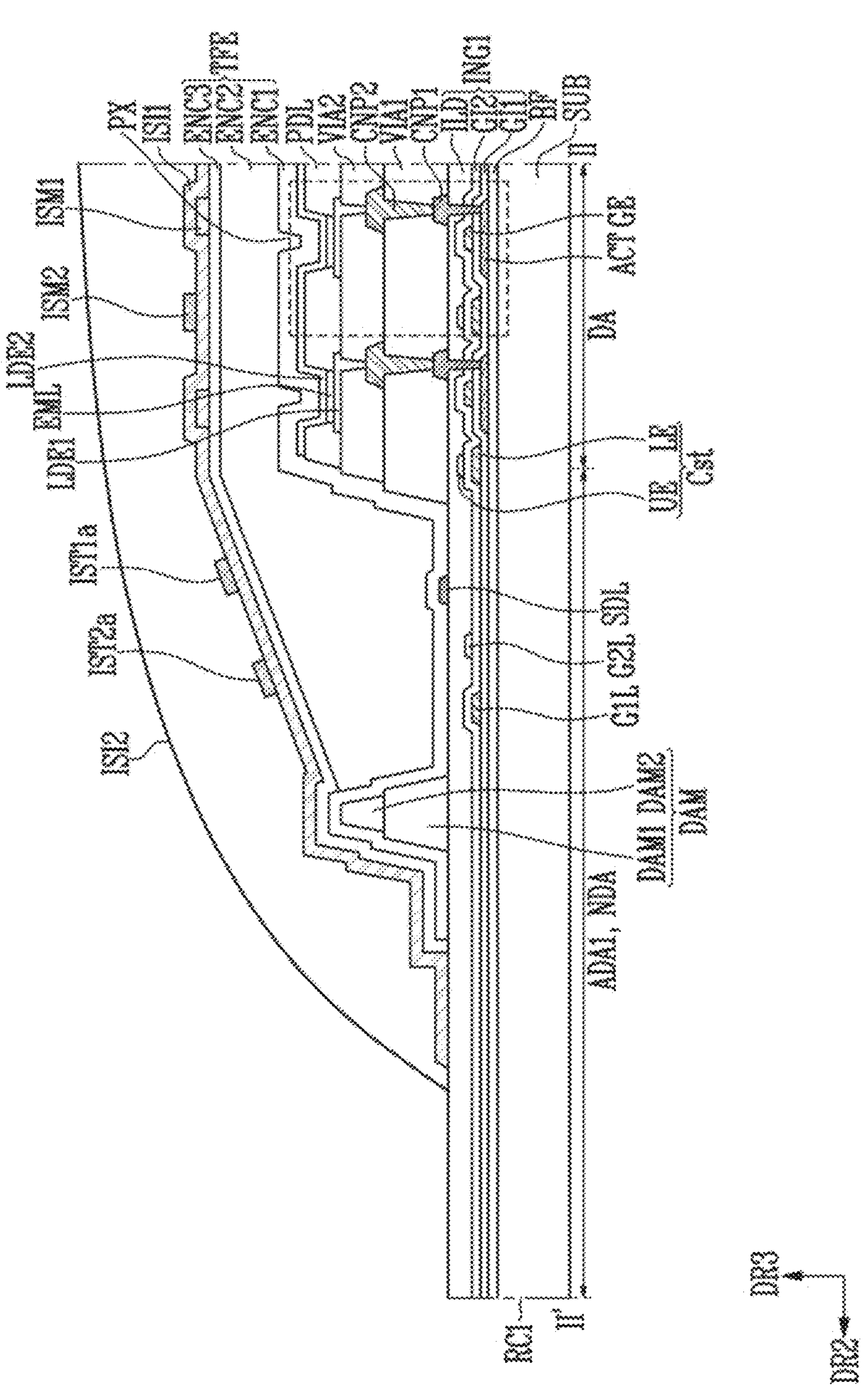

FIG. 14 is an embodiment of a cross-section taken along line II-II' of FIG. 12.

The line II-I' of FIG. 12 may correspond to the first bending axis BX1. However, the same embodiment may be applied to the second side RC2 as well as the first side RC1.

The display lines DST may be configured of a single layer line or a multiple layer line using at least one of lines G1L, G2L, and SDL. The line G1L may be formed from the same material and through the same process as the gate electrode GE. The line G2L may be formed from the same material and through the same process as the upper electrode UE. The line SDL may be formed from the same material and through the same process as the first connection pattern CNP1.

The patterns IST1*a* and IST12*a* of the sensing lines IST1 and IST2 may be positioned on the encapsulation layer TFE and the first sensing insulating layer ISI1 (in the third direction DR3) and may be positioned between the dam DAM and the display area DA (in the second direction DR2). The first sensing insulating layer ISI1 may be positioned between the encapsulation layer TFE and the sensing lines IST1 and IST2.

Figure 15:
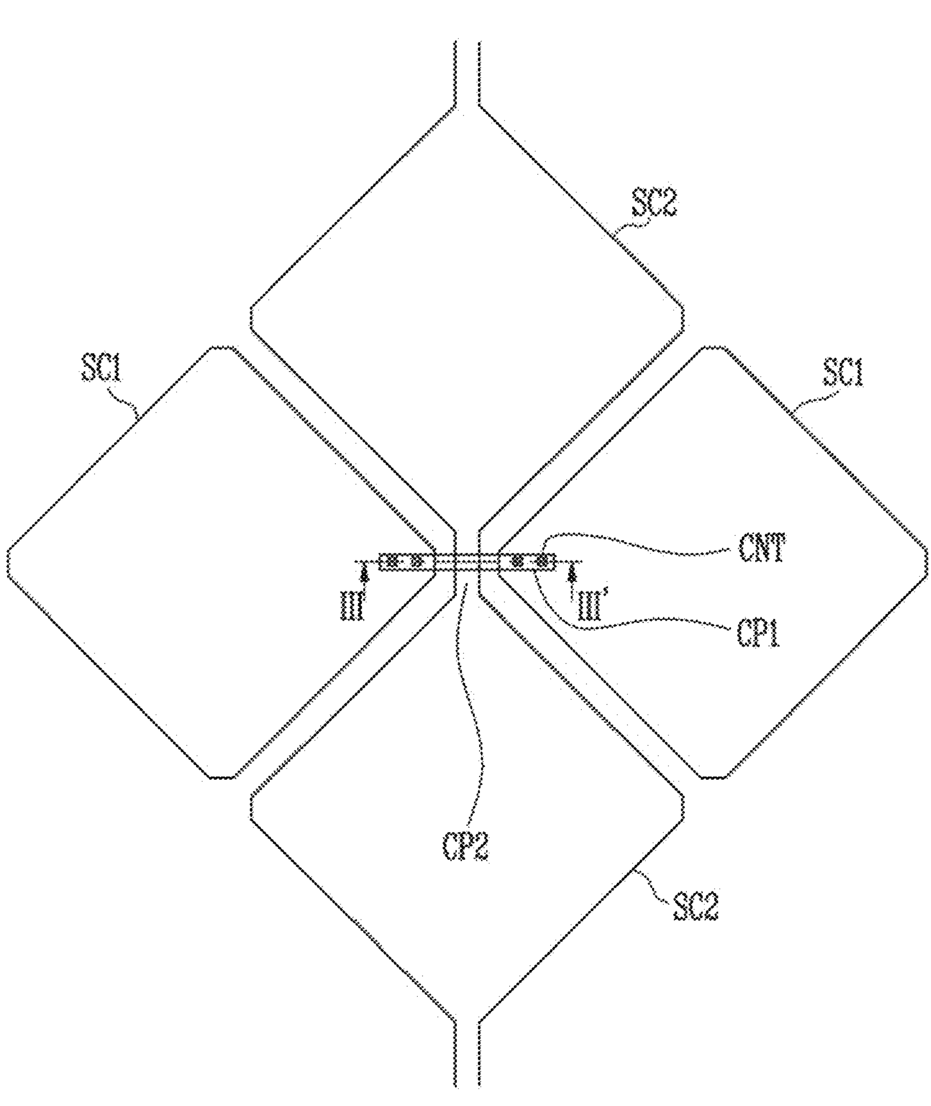
Figure 16:
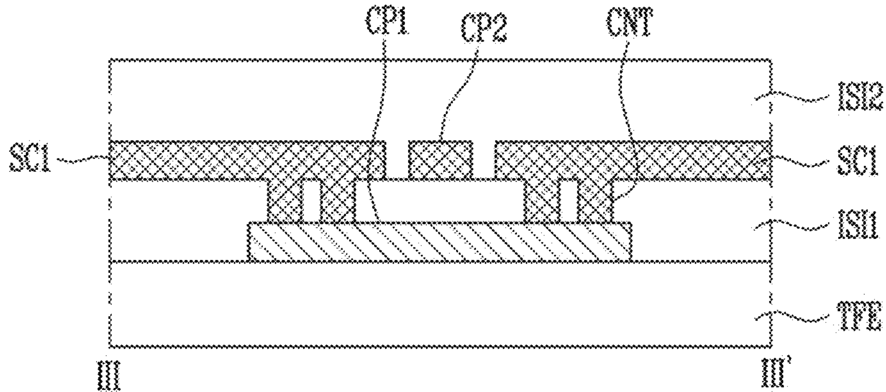

FIGS. 15 and 16 are diagrams illustrating sensing electrodes and bridge electrodes according to an embodiment of the disclosure. FIG. 16 is a cross-sectional view taken along line III-III' of FIG. 15.

The bridge electrodes CP1 may be positioned on the encapsulation layer TFE by patterning the first sensing electrode layer ISM1.

The first sensing insulating layer ISI1 may cover the bridge electrode CP1 and may include contact holes CNT exposing a portion of the bridge electrodes CP1.

The first sensing electrodes SC1 and the second sensing electrodes SC2 may be formed on the first sensing insulating layer ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. Therefore, in connecting the second sensing electrodes SC2, a separate bridge electrode may be unnecessary.

According to an embodiment, each of the sensing electrodes SC1 and SC2 may cover the plurality of pixels PX. In this case, when each of the sensing electrodes SC1 and SC2 is configured of an opaque conductive layer, each of the sensing electrodes SC1 and SC2 may include a plurality of openings capable of exposing the plurality of covered pixels PX. For example, each of the sensing electrodes SC1 and SC2 may be configured in a mesh shape. When each of the sensing electrodes SC1 and SC2 is configured of a transparent conductive layer, each of the sensing electrodes SC1 and SC2 may be configured in a plate shape that does not include an opening.

Figure 17:
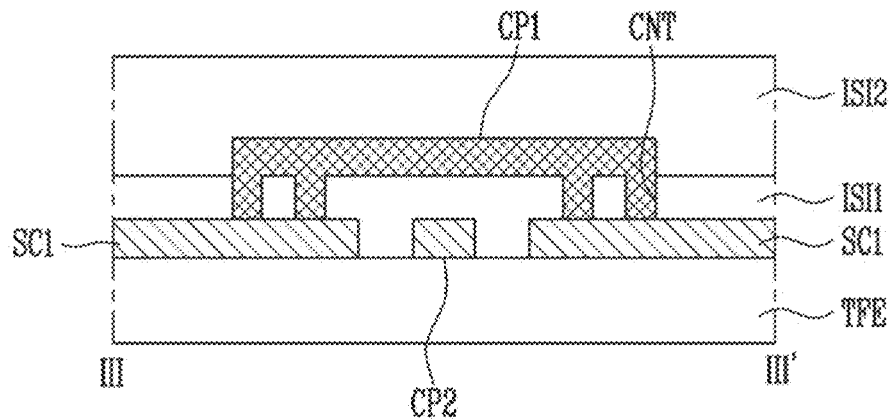

FIG. 17 is a diagram illustrating sensing electrodes and bridge electrodes according to another embodiment of the disclosure.

FIG. 17 is another cross-sectional view taken along the line III-III' of FIG. 15.

The first sensing electrodes SC1 and the second sensing electrodes SC2 may be formed on the encapsulation layer TFE by patterning the first sensing electrode layer ISM1.

The first sensing insulating layer ISI1 may cover the first sensing electrodes SC1 and the second sensing electrodes SC2 and may include contact holes CNT exposing a portion of the first sensing electrodes SC1.

The bridge electrodes CP1 may be positioned on the first sensing insulating layer ISI1 by patterning the second sensing electrode layer ISM2. The bridge electrodes CP1 may be connected to the first sensing electrodes SC1 through the contact holes CNT.

Figure 18:
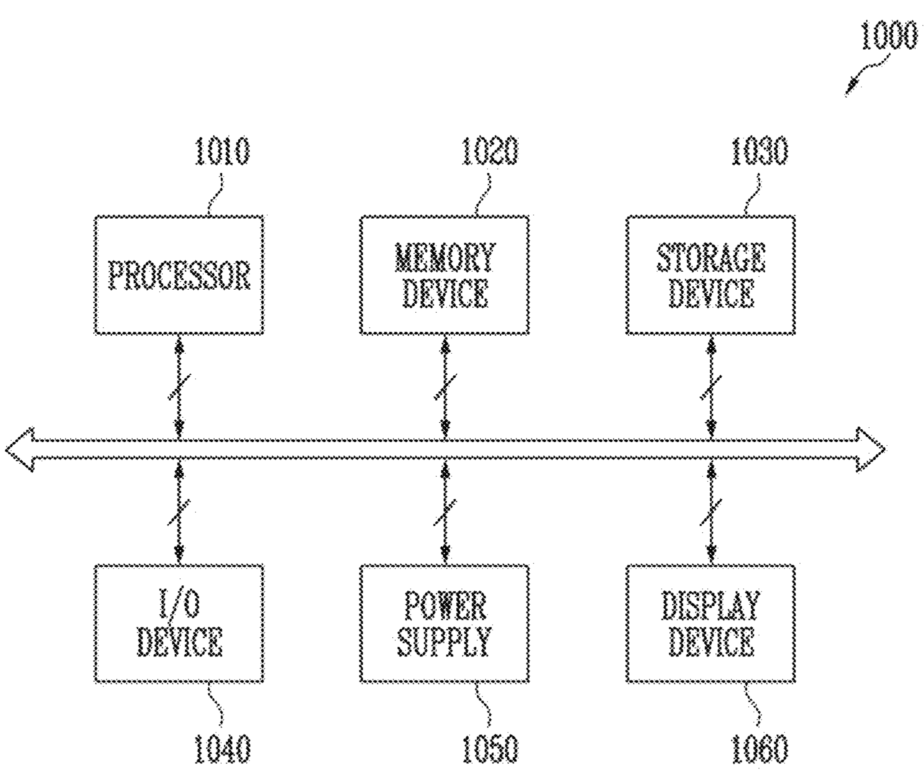
FIG. 18 is a block diagram illustrating an electronic device in accordance with embodiments of the present disclosure.
Figure 19:
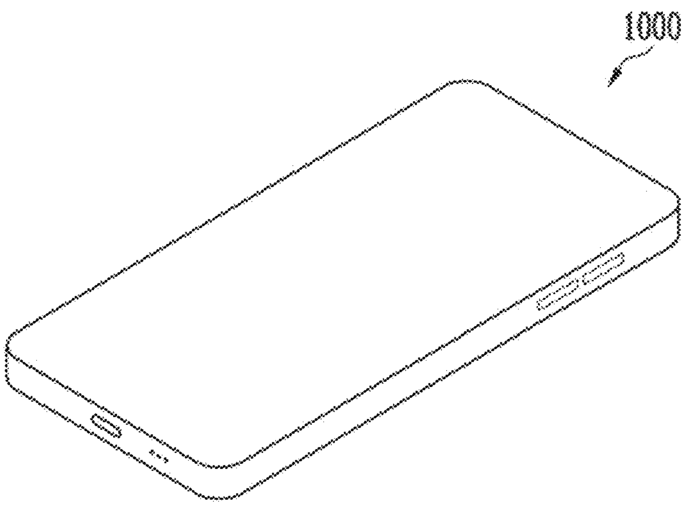
FIG. 19 is a schematic diagram illustrating an example where the electronic device of FIG. 18 is implemented as a smartphone.
Figure 20:
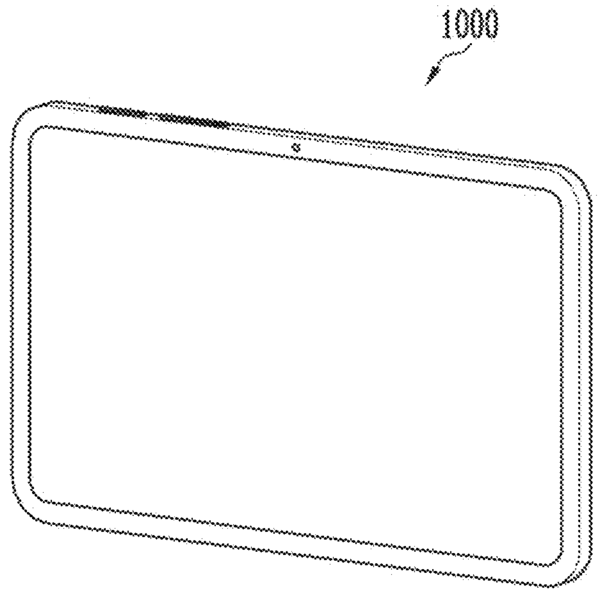
FIG. 20 is a schematic diagram illustrating an example where the electronic device of FIG. 18 is a tablet computer.

FIG. 18 is a block diagram illustrating an electronic device 1000 in accordance with embodiments of the present disclosure. FIG. 19 is a diagram illustrating an example where the electronic device 1000 of FIG. 18 is a smartphone. FIG. 20 is a schematic diagram illustrating an example where the electronic device 1000 of FIG. 18 is a tablet computer.

Referring to FIGS. 18 to 20, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may further include various ports for communication with a video card, a sound card, a memory card, a USB device, or other systems. In an embodiment, as illustrated in FIG. 19, the electronic device 1000 may be implemented as a smartphone. In an embodiment, as illustrated in FIG. 20, the electronic device 1000 may be implemented as a table computer. However, the aforementioned examples are illustrative, and the electronic device 1000 is not limited to the aforementioned examples. For example, the electronic device 1000 may be implemented as a cellular phone, a video phone, a smart pad, a smartwatch, a navigation device for vehicles, a computer monitor, a laptop computer, a head-mounted display device, and so on.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

The drawings referred to so far and the detailed description provided herein are merely examples of the disclosure, intended for illustrated purposes only, and are not meant to limit the meaning and scope of the disclosure as described in claims. Therefore, those skilled in the art will understand that various modifications and equivalent embodiments are possible based on these examples.

What is claimed is:

1. A display device comprising:

a display driver configured to output a scan signal during a frame period, the frame period including at least one data writing period; and a sensor driver configured to control a duty cycle of a driving signal during the data writing period based on the scan signal.

2. The display device according to claim 1, wherein the data writing period is a period in which the scan signal is set to a turn-on level.

3. The display device according to claim 1, wherein the data writing period is a period in which the scan signal is set to a turn-on level.

4. The display device according to claim 3, wherein the polarity of the driving signal is a first polarity when a final edge of the driving signal is a first edge during the data writing period, and is a second polarity when the final edge of the driving signal is a second edge during the data writing period.

5. The display device according to claim 1, wherein the frame period includes a first data writing period followed by a second data writing period, and a polarity of the driving signal during the first data writing period is different from the polarity of the driving signal during the second data writing period.

6. The display device according to claim 5, wherein when the polarity of the driving signal is a first polarity during the first data writing period, the polarity of the driving signal is a second polarity during the second data writing period.

7. The display device according to claim 1, wherein the sensor driver comprises:

a time point calculator configured to calculate a length of the data writing period and calculate a next edge time point; and a signal generator configured to control the duty cycle of the driving signal so that a polarity of the driving signal alternates during each data writing period based on the next edge time point.

8. The display device according to claim 7, wherein during a first data writing period of the frame period, the time point calculator calculates the length of the data writing period from a detected first edge time point of the scan signal and a detected second edge time point of the scan signal.

9. The display device according to claim 8, wherein during a second data writing period after the first data writing period, the time point calculator calculates the next edge time point based on the detected first edge time point of the scan signal in the second data writing period and the length of the second data writing period.

10. The display device according to claim 9, wherein the detected first edge time point is a rising edge time point, and the detected second edge time point and the next edge time point are falling edge time points.

11. The display device according to claim 7, wherein the signal generator adjusts the duty cycle of the driving signal so that a final edge of the driving signal becomes a second edge before the next edge time point, when the final edge of the driving signal of a previous data writing period is a first edge.

12. An electronic device, comprising:

a processor to provide input image data; and a display device to display an image based on the input image data, the display device comprising:

a display driver configured to output a scan signal during a frame period, the frame period including at least one data writing period; and a sensor driver configured to control a duty cycle of a driving signal during the data writing period based on the scan signal.

13. The electronic device according to claim 12, wherein the data writing period is a period in which the scan signal is set to a turn-on level.

14. The electronic device according to claim 12, wherein a polarity of the driving signal is a first polarity when a final edge of the driving signal is a first edge during the data writing period, and is a second polarity when the final edge of the driving signal is a second edge during the data writing period.

15. The electronic device according to claim 12, wherein the frame period includes a first data writing period followed by a second data writing period, and a polarity of the driving signal during the first data writing period is different from the polarity of the driving signal during the second data writing period.

* * * * *